US010598777B2

(12) United States Patent
Eberspaecher et al.

(10) Patent No.: US 10,598,777 B2
(45) Date of Patent: Mar. 24, 2020

(54) PROXIMITY SENSOR AND METHOD FOR MEASURING THE DISTANCE FROM A TARGET

(71) Applicant: Balluff GmbH, Neuhausen a.d.F. (DE)

(72) Inventors: Mark Eberspaecher, Frickenhausen (DE); Sorin Fericean, Leonberg (DE)

(73) Assignee: Balluff GmbH, Neuhausen a.d.F. (DE)

(*) Notice: Subject to any disclaimer, the term of this patent is extended or adjusted under 35 U.S.C. 154(b) by 258 days.

(21) Appl. No.: 15/538,720

(22) PCT Filed: Dec. 23, 2014

(86) PCT No.: PCT/DE2014/100464
§ 371 (c)(1),
(2) Date: Jun. 22, 2017

(87) PCT Pub. No.: WO2016/101940
PCT Pub. Date: Jun. 30, 2016

(65) Prior Publication Data
US 2017/0363730 A1 Dec. 21, 2017

(51) Int. Cl.
*H01Q 13/06* (2006.01)
*H01P 1/20* (2006.01)
(Continued)

(52) U.S. Cl.
CPC ............. *G01S 13/32* (2013.01); *G01S 7/026* (2013.01); *G01S 7/03* (2013.01); *G01S 7/40* (2013.01); *G01S 13/36* (2013.01); *H01Q 13/06* (2013.01)

(58) Field of Classification Search
CPC . G01S 13/32; G01S 13/36; G01S 7/03; G01S 17/87; G01S 5/16; H01Q 13/06
(Continued)

(56) References Cited

U.S. PATENT DOCUMENTS 5,214,376 A * 5/1993 Sikora ................... G01B 7/087
324/207.15
5,728,092 A 3/1998 Doiron et al.
(Continued)

FOREIGN PATENT DOCUMENTS

CN 202453036 U 9/2012
DE 10 2010 009 664 A1 9/2011
(Continued)

OTHER PUBLICATIONS

Diskus, C. et al., "Six-Port Receiver and Frequency Measurement for Radar Applications at 35GHz," Subsurface Sensing Technologies and Applications vol. 1, No. 3, Nov. 1999, pp. 271-288.*
(Continued)

*Primary Examiner* — John E Breene
*Assistant Examiner* — Jeffrey P Aiello
(74) *Attorney, Agent, or Firm* — Collard & Roe, P.C.

(57) ABSTRACT

A proximity sensor for measuring the distance from a target contains a microwave oscillator providing a transmission wave output signal emitted toward the target as a free space transmission wave which is reflected by an electrically conductive target surface as a free space reflection wave received by the proximity sensor as a reflection wave. The distance is determined from the transmission wave and the reflection wave. The transmission wave is guided in a waveguide transmission path as a waveguide transmission wave. The transmission wave is coupled into the waveguide with a wave mode leading to the detachment of the waveguide transmission wave at the waveguide front end aperture into the free space transmission wave and to the propagation of the free space transmission wave to the target. At least one reception path is electromagnetically decoupled from the transmission path and guides the reflection wave as a waveguide reflection wave.

29 Claims, 12 Drawing Sheets

(51) Int. Cl.
*G01S 13/36* (2006.01)
*G01S 7/03* (2006.01)
*G01S 13/32* (2006.01)
*G01S 7/02* (2006.01)
*G01S 7/40* (2006.01)

(58) Field of Classification Search
USPC ............ 324/601; 356/614; 367/99; 702/150, 702/158, 159
See application file for complete search history.

(56) References Cited

U.S. PATENT DOCUMENTS

| | | | | |
|---|---|---|---|---|
| 5,905,380 | A * | 5/1999 | Weiner | G01S 7/02 324/637 |
| 6,204,810 | B1 * | 3/2001 | Smith | H04B 7/10 342/361 |
| 6,445,191 | B1 | 9/2002 | Trummer | |
| 6,553,161 | B1 * | 4/2003 | Upton | G02B 6/4225 385/25 |
| 8,800,363 | B2 | 8/2014 | Edvardsson | |
| 9,952,297 | B2 * | 4/2018 | Wang | G01R 33/34092 |
| 2001/0003442 | A1 * | 6/2001 | Smith | H04B 7/10 342/365 |
| 2007/0030097 | A1 * | 2/2007 | Chang | H01P 1/16 333/137 |
| 2007/0063914 | A1 * | 3/2007 | Becker | A62C 35/60 343/840 |
| 2007/0176605 | A1 * | 8/2007 | Li | G01N 23/046 324/534 |
| 2009/0021442 | A1 * | 1/2009 | Syed | H01Q 1/24 343/781 CA |
| 2010/0141543 | A1 * | 6/2010 | Parekh | H01P 1/161 343/786 |
| 2011/0148649 | A1 * | 6/2011 | de Cavalcanti | H01R 13/6683 340/686.6 |
| 2011/0148650 | A1 * | 6/2011 | Jenkins | H01R 13/6683 340/686.6 |
| 2011/0153880 | A1 * | 6/2011 | McCoy | F25D 29/005 710/33 |
| 2013/0207748 | A1 * | 8/2013 | Morini | H01P 1/066 333/256 |
| 2014/0219142 | A1 * | 8/2014 | Schulz | H04L 5/14 370/280 |
| 2016/0020520 | A1 * | 1/2016 | McCarrick | H01Q 13/0241 343/756 |
| 2016/0124083 | A1 | 5/2016 | Fericean et al. | |

FOREIGN PATENT DOCUMENTS

| | | |
|---|---|---|
| EP | 1 000 314 B1 | 4/2002 |
| WO | 2012/061746 A2 | 5/2012 |
| WO | 2015/000452 A1 | 1/2015 |

OTHER PUBLICATIONS

Andreas Stelzer et al: "A Microwave Position Sensor with Submillimeter Accuracy", IEEE Transactions on Microwave Theory and Techniques, vol. 47, No. 12, Dec. 1, 1999.
S. Bonerz, W. Bechteler, J. Greif, "Sensorsystem zur Überwachung der Werkzeugplananlage auf Basis von Keramikresonatoren and Hohlleiterstrukturen", ANSYS Conference and 29th CADFEM Users Meeting, Oct. 19-21, 2011.
T. F. Bechteler, A. S. A. Bechteler, "The Groove-Guide Oscillator,", IEEE Microwave Magazine, vol. 12, No. 6, pp. 110-119, Oct. 2011.
C. Nguyen S. Kim, Abstract (p. vii) from "Theory, Analysis and Design of RF Interferometric Sensors", Springer-Verlag 2012.
English translation of the International Preliminary Report on Patentability and Written Opinion of the International Searching Authority of PCT/DE2014/100464 dated Jul. 6, 2017.
International Search Report of PCT/DE2014/100464, dated Sep. 9, 2015.
Paul Wade, Septum Polarizers and Feeds, http://www.w1ghz.org/antbook/conf/SEPTUM.pdf, 2003, 20 pages.
Christian G Diskus et al: "35 GHz six-port receiver for radar applications", Jul. 18, 1999, Downloaded From: http://proceedings.spiedigitallibrary.org on Feb. 24, 2017, pp. 355-365.
Chinese Office Action in CN 201480084280.7, dated Sep. 18, 2019.

* cited by examiner

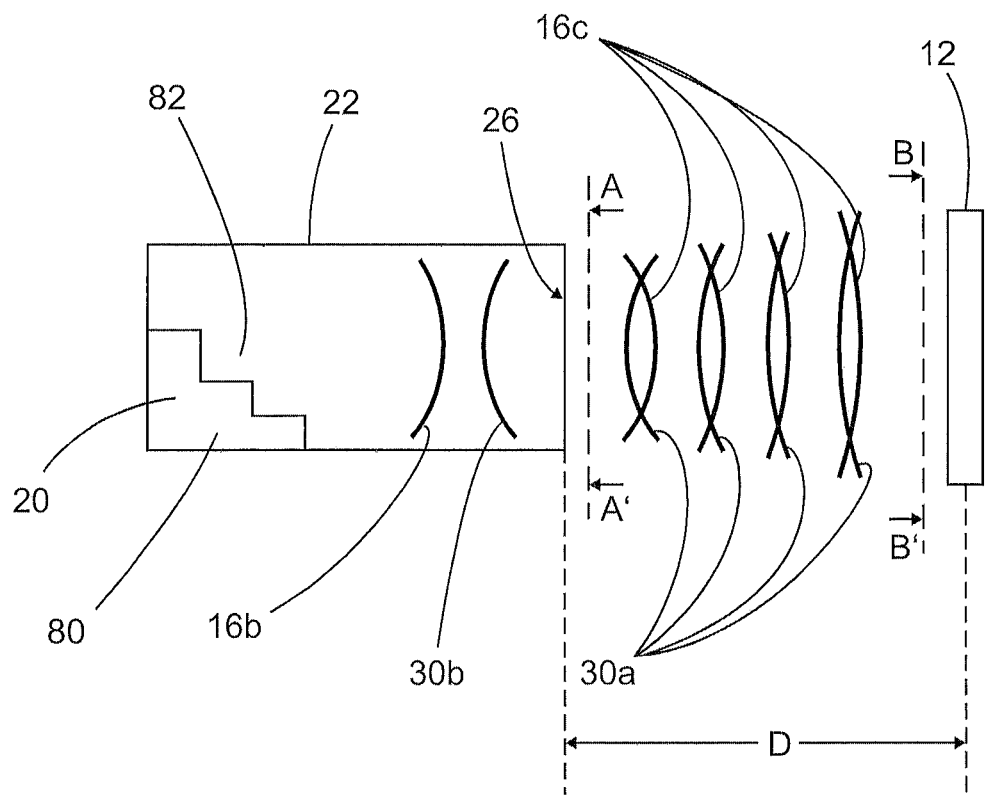
Fig. 10
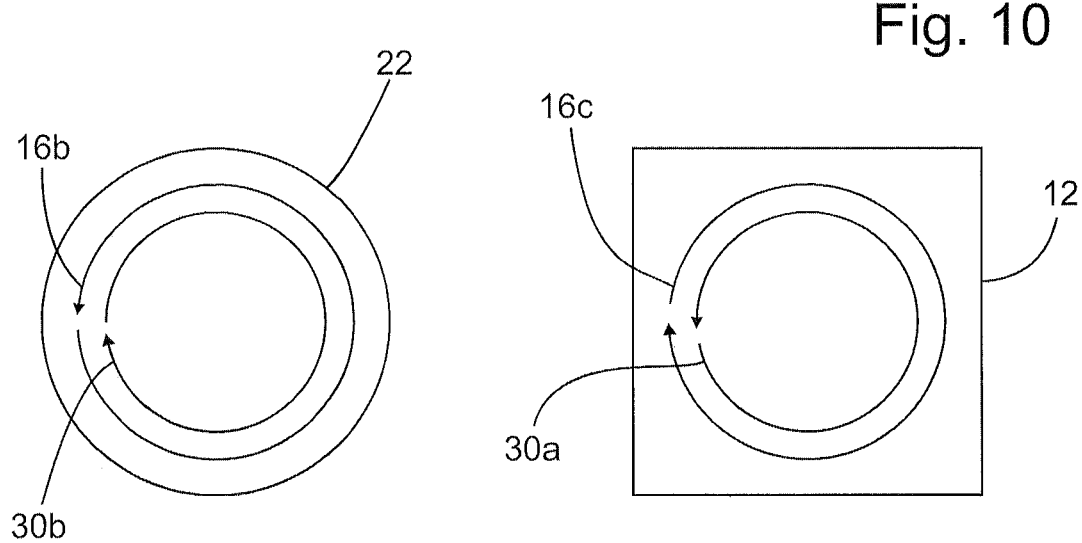
Fig. 11
A - A'
Fig. 12
B - B'

PROXIMITY SENSOR AND METHOD FOR MEASURING THE DISTANCE FROM A TARGET

CROSS REFERENCE TO RELATED APPLICATIONS

This application is the National Stage of PCT/DE2014/100464 filed on Dec. 23, 2014, the disclosure of which is incorporated by reference. The international application under PCT article 21(2) was not published in English.

The invention is based on a proximity sensor and a method for measuring the distance from a target according to the type of the independent claims.

PRIOR ART

In the patent specification EP 1 000 314 B1, a circular cylindrical distance measuring device is described that is based on determining the resonance frequency of a cavity resonator. The resonator is formed from the resonator housing and the target to be detected. The physical resonator length is thus composed from the length of the resonator housing and the distance to the target. If a minimum size of the target to be detected is exceeded, the resonator frequency is immediately linked to the length of the resonator, from which the target distance can be inferred. The specific dependency between resonator length and resonance frequency depends on the present field distribution and thus on the waveguide wave mode used. The electric permittivity of the waveguide filling is thus included as a deciding factor in the design. If this value increases, on the one hand, both the construction length of the resonator and the required cross-section get smaller. On the other hand, the range of the distance measuring device is, however, also reduced with increasing permittivity.

With the concept described, a metallised dielectric is provided as a resonator rear wall, the evaluation electronic system being located on said metallised dielectric on the outside. To couple the electronic system to the resonator, either a coplanar slot coupling or a microstrip line is proposed. Coupling by means of the microstrip line is then, above all, helpful when the evaluation electronic system is to be remotely assembled from the resonator, for example because of the thermal uncoupling. Additionally, either one or two coupling points can be implemented depending on whether the resonator is to be used in transmission or in reflection operation.

To determine the resonance frequency, the evaluation electronic system contains an adjustable oscillator, the frequency of which being linearly tuned within a certain bandwidth and the resulting reflection or transmission factor of the resonator being observed. In the vicinity of one resonance frequency, these factors have strong variations that can be recognised systematically by differentiating with respect to on the frequency. Since a linear connection between frequency and time exists in a circuitry manner because of the control, the derivation with respect to the frequency can be obtained by means of a derivation with respect to the time. If the second derivation obtained in such a way exceeds a predetermined threshold, a resonance is recognised and the frequency is not further detuned, but kept constant and its current value is determined by means of a frequency counter.

As an alternative approach for determining the frequency, in the patent specification EP 1 000 314 B1, a concept based on a closed phase-locked loop (PLL) is proposed. In doing so, the nominal frequency is predetermined via a direct digital synthesiser (DOS) as a reference variable of the PLL. If the detection circuit now recognises a resonance, the frequency is immediately known because of the settings of the digital synthesiser, whereby the cycle duration of a measurement can clearly be shortened.

Regardless of how the resonance frequency is determined, with this resonator method, the fact that the distance region to be determined immediately predetermines the necessary bandwidth of the operational frequency is disadvantageous. The usable bandwidth for industrial sensors is fixedly predetermined and thus the distance region as well.

Regardless of the ISM band allowed (Industrial, Scientific and Medical band), a frequency range of between 1-100 GHz for the operation is proposed, wherein the bandwidth should be roughly 2 GHz or 10%. Additionally, it has proved to be difficult to be able to implement large distance ranges with this resonator concept. The reason for this is, on the one hand, that with distances that are getting larger, the changes to the resonance frequency get smaller. Additionally, the worsening quality of the resonator still only leads to weakly pronounced minima in the reflection or transmission factors, whereby the detection of the associated resonance frequencies become prone to error. This is obvious when the location of the resonance frequency is seen in the complex frequency plane. With decreasing quality, the complex eigenfrequency can be removed from the w-axis, whereby, when detuning the oscillator, a singularity can no longer be run through. The limited range is additionally caused by the choice of the TE01 wave mode used since the field distribution around the waveguide in this case has extensively evanescent waves that subside quickly with increasing removal.

In the review by S. Bonerz, W. Bechteler, J. Greif, "Sensorsystem zur Überwachung der Werkzeugplananlage auf Basis von Keramikresonatoren and Hohlleiterstrukturen", ANSYS Conference and $29^{th}$ CADFEM Users Meeting, 19-21 Oct. 2011, a method was proposed in which the determination of a distance of a target from a distance sensor was also based on a waveguide resonator. Here too, the distance to be measured determines the length of a resonator and thus the resonance frequency thereof. Here, the waveguide wave mode used is the base mode TE11 of a circular cylindrical waveguide. The resonance frequency is determined by a frequency sweep by means of measuring the received active power of the resonator.

In the review by T. F. Bechteler, A. S. A. Bechteler, "The Groove-Guide Oscillator,", IEEE Microwave Magazine, Vol. 12, No. 6, pages 110-119, October 2011, a distance measuring method is described based on a so-called groove-guide oscillator that also corresponds to a resonator concept. Although here, too the problem of distance measuring is also traced back to determining eigenfrequencies of a resonator, this system, however, differs fundamentally both in terms of construction of the resonator and in the proposed determination of the resonance frequency from the solution approach described in the patent specification EP 1 000 314 B1. The core of the known distance sensor forms a groove-guide oscillator. In principle, in microwave technology, groove-guide is to be understood as a waveguide that includes two plates opposing one another into which, in the propagation direction of the waves, a notch with a rectangular cross-section is introduced in each case. The whole arrangement is symmetrical relative to one plane, the normal of which coincides with the connection line of the two plates. In the cavity that emerges from the notches and the conductive plates, wave modes capable of propagation can exist in the direction of the notches. Because of the symmetry required and the strong dependency of the propagation properties on the plate distance, this waveguide places high demand on the manufacturing accuracy.

The manufacture of an alternatively useable "half-symmetrical" waveguide is substantially easier, in which the one half of the arrangement is completely replaced by a conductive plane.

The dependency also present in the described waveguides of the propagation constants of the distance to the target is used to determine the distance. Thus, for implementing a resonator, the notch is introduced such that it is not straight anymore, but circular, so that a circular conductor loop emerges. A resonance then arises exactly when an integer multiple of the guided wavelength corresponds exactly to the conductor circumference. Since the guided wavelength is a function of the plate distance and the frequency, the resonance condition can be met within a certain bandwidth for different distances and, as a result, information about the distance can be obtained.

The oscillator is energised by means of a Gunn element, whereby the oscillator oscillates on its eigenfrequency. The frequency determination then takes place by means of a heterodyne system, in which the down-mixed eigenfrequency is supplied to a frequency counter. Because of the construction, the described distance sensor has a large overall size since the diameter of the resonator has to be chosen to be comparatively large in order to keep the loss of radiation in the radial direction small. For operation between 8-12 GHz, the diameter of the described resonator is 60 mm with a plate size of 200 mm×200 mm. The measuring region obtained thereby extends from 13-15 mm. If the plate distance is further increased, higher wave modes can occur in the observed frequency region, whereby ambiguity arises.

In the patent specification DE 10 2010 009 664 A1, a distance sensor is described that, on the one hand, is used for monitoring the distance between a work spindle of a tool machine and the stationary part of the tool machine and, on the other hand, for controlling a tool's contact with a face. Additionally, conclusions about the rotational speed of the work spindle and the quality of the spindle mount are possible.

The distance sensor contains a high frequency wire that is connected to an oscillator and to a reflection measuring device. The position of the work spindle relative to the high frequency wire influences the reflection properties such that the distance can be calculated from the determined reflection factor. The high frequency wire is implemented, for example, as a micro strip line that is produced from a flexible material which is fixed on the surface of the stationary part of the tool machine by adhesion.

A high frequency transmission signal provided by an oscillator is coupled into the high frequency wire. One part of the transmission signal is decoupled from a first directional coupler and supplied to a power detector. The predominant part of the transmission signal is fed into the high frequency wire after passing through a second directional coupler.

The reflection signal irradiated back from the target superimposes the transmission signal. One part of the reflection signal is decoupled from the second directional coupler and supplied to a second power detector. The two power detectors are connected to an evaluating unit that determines and emits the ratio of the two powers, i.e. the reflection factor, from which a measure for the distance of the target can be specified.

Additionally, another dielectric resonator can be provided that causes a pronounced resonance property of the distance sensor. A change of the distance of the target from the dielectric resonator causes a shift of the resonance frequency of the dielectric resonator. Determining the distance of the target can then, additionally or alternatively, can be based on the evaluation of the frequency change.

In the review by C. Nguyen, S. Kim, Theory "Analysis and Design of RF Interferometric Sensors", Springer-Verlag 2012, an interferometric method for operating a distance sensor is described. In this method, to obtain the distance information, a phase shift between a sent and a received signal is evaluated. In doing so, distances between the distance sensor and the target, which are greater than half the wavelength of the signal, can no longer be clearly recognised from the phase length. In the review, it is proposed to obtain a clear piece of phase information by means of algorithms of the signal processing. Nevertheless, it is necessary here that the target is shifted from the start to the position to be measured, wherein the phase is continuously recorded. An absolute measuring distance sensor cannot be implemented with this.

In the review by A Stelzer et al. "A Microwave Position Sensor with Submillimeter Accuracy", IEEE Transaction on Microwave Theory and Techniques, Vol. 47, No. 12, December 1999, a hybrid method is described in which the interferometric method is combined with the known radar method, for example the FMCW method (Frequency Modulation Continuous Wave). Although such a method again allows a clear distance determination, the method cannot simply be used to replace known inductive distance sensors in the industrial sector. The main reason for this is that, typically, the minimally possible measuring distance is determined by means of the bandwidth of the operating frequency such that it cannot be measured up to position zero. Furthermore, applicable rules relating to emissions of electromagnetic radiation have to be observed. An operation is only possible within an ISM band, which is why it cannot be freely decided on the bandwidth and the resulting minimum distance. For example, a minimum distance of 60 cm appears for a standard system fully using the available bandwidth of 250 MHz of the ISM band at 24 GHz.

In the non-pre-published patent application PCT/DE2013/000342, a sensor for determining the position or the distance of a target is described, with which the microwave technique for determining the position or the distance is also used. The proximity sensor described contains a microwave oscillator that provides a transmission wave as an output signal, which the proximity sensor irradiates in the direction of the target as a free space transmission wave that the target, which is electrically conductive or at least has an electrically conductive surface, reflects as a free space reflection wave and the proximity sensor received as a reflection wave. Determining the reflection factor from the transmission wave and the reflection wave is provided, which the proximity sensor provides as a measure for the distance. The proximity sensor described is characterised in that the coupling of the transmission wave in the waveguide is guided as waveguide transmission wave, the coupling of the transmission wave into the waveguide is provided by a wave mode that leads to detaching the waveguide transmission wave at the aperture on the front end of the waveguide into the free space transmission wave and to propagating the free space transmission wave to the target. Measuring with higher and measuring with lower resolution can be assumed in order to obtain clarity over a greater distance. With greater distances, ambiguity of the phase angle of the complex reflection factor occurs. A clear determination of the distance from the phase of the reflection factor is therefore provided by considering the magnitude of the reflection factor, if there is ambiguity of the phase of the reflection factor within the predetermined measuring region.

At the internet link, http://www.w1ghz.org/antbook/conf/SEPTUM.pdf, a septum polariser is described that enables a separation of electromagnetic waves running in a waveguide. The septum is an electrically conductive separating wall arranged on the rear end of the waveguide in terms of the aperture and aligned in the propagation direction of the waves. The front limiting line of the septum, in a side view, has a continuous or stepped course such that the surface of the septum gets smaller in the direction of the aperture.

On the two sides of the waveguide in the region of the septum, there are the connections, wherein a connection for feeding-in a high frequency signal and the opposing connection for decoupling a high frequency signal can be used. The specially formed front limiting line of the septum leads in a circular cylindrical waveguide to the two orthogonal TE11 wave modes being excited, said wave modes being formed in such a way that the E-field of the other wave mode is aligned to be perpendicular to the septum and the E-field of the other wave mode to be parallel to the septum. On the condition that the septum is formed to be thin, the wave mode that is perpendicular to the septum is not affected by the septum, whereas the phase speed of the wave mode lying parallel to the septum can be affected by the front limiting line. The limiting line, formed, for example, to be stepped, is chosen in such a way that the two wave modes have a phase shift of 90 degrees, whereby the superposition thereof results in a circularly polarised wave. Since the perpendicular components in the two different halves are aligned in opposition to each other, the excitation in one half results in a right-rotating circularly polarised wave, whereas in the other half, a left-rotating circularly polarised wave emerges from the excitation.

The object of the invention is to specify a proximity sensor and a method for measuring the distance of a target with a wide detection range that, furthermore, are independent of the permeability of the metallic target to be detected and that enable a determination of the distance with different methods.

The object is solved by the features stated in each case in the independent claims.

Disclosure of the Invention

The invention is based on a proximity sensor for measuring the distance of a target from the proximity sensor. The proximity sensor contains a microwave oscillator that provides a transmission wave as an output signal, said transmission wave being emitted by the proximity sensor in the direction of the target as a free space transmission wave that the target, which is electrically conductive or at least has an electrically conductive surface, reflects as a free space reflection wave and is received by the proximity sensor as a reflection wave, wherein determining of the distance from the transmission wave and the reflection wave is provided. The transmission wave is led into a waveguide as a waveguide transmission wave. Coupling the transmission wave into the waveguide is provided with a wave mode that leads to detaching the waveguide transmission wave and to propagating the free space transmission wave relative to the target. The proximity sensor according to the invention is characterised in that, in the waveguide, a transmission path for guiding the transmission wave as a waveguide transmission wave and at least one receiving path electromagnetically decoupled from the transmission path for guiding the reflection wave as a waveguide reflection wave are provided.

The implementation of the proximity sensor according to the invention by the two paths electromagnetically decoupled from each other and provided in the waveguide for the waveguide transmission wave, on the one hand, and for the waveguide reflection wave, on the other hand, enable, additionally or alternatively to the reflection factor, the transmission factor to be determined, wherein the reflection factor is calculated from the ratio of reflection wave to transmission wave within one path and the transmission factor from the ratio of the reflection wave in the receiving path relative to the transmission wave in the transmission path. In general, the transmission factor can be determined from the ratio of the out to incoming waves at the separate gates.

The transmission factor is a quantity that is able to be measured depending on the distance of the target, since, as a result, the signal path is described that is formed by the transmitting path in the waveguide, the path route to the target and back again and the receiving path in the waveguide. Thus, the two-fold path between sensor and target both in the reflection factor and in the transmission factor is included; however, their paths differ in the waveguide, from which different measurement values result.

In doing so, the shaping of the wave guidance within the waveguide can influence the way in which the distance to the target has an effect on the magnitude of the transmission factor. For example, the sensor head can be formed in such a way that the transmission and receiving path run separately from one another up to the active edge of the sensor, whereby the transmission factor becomes zero when the target lines up on the active surface. In this case, the target interrupts the signal path between the transmission and receiving path, whereas the reflection factor becomes maximum. Alternatively, the transmission and receiving path can be led together even in front of the active surface, whereby the maximum magnitude can be shifted up to the smaller distance values.

The proximity sensor according to the invention, in comparison to inductive proximity sensors, for example, offers a considerably wider measuring region that can be greater by up to a factor of 10 and a greater linearity region.

Compared to a proximity sensor according to the standard radar principle that has a blind region from zero up to a minimum distance depending on the principle, very small distances can be detected by the proximity sensor according to the invention in the region of zero up to a few centimetres.

Compared to a proximity sensor that uses a characteristic resonance property, the partially time-intensive attempts of a resonance frequency is no longer required and the bandwidth is independent of the distance measuring region, wherein a very narrow banded operation or even an operation with the bandwidth of zero is possible.

Because of the loss of a modulation of the transmission wave and loss of the discontinued operation of the microwave oscillator, the proximity sensor according to the invention claims only a narrow high frequency bandwidth. It is thus even possible that the bandwidth is zero. As a result, the proximity sensor complies without issue with the relevant EMV requirements.

A further substantial advantage of the proximity sensor according to the invention is that the measuring result is extensively independent of the permeability of the target.

With a view to the manufacture, it is an advantage that the proximity sensor according to the invention can be implemented in standard forms of construction of known inductive proximity sensors.

The embodiment according to the invention of the proximity sensor having a waveguide in which the coupling of the transmission wave is provided with a wave mode that leads to detaching the waveguide transmission wave at the aperture on the front end of the waveguide into a free space transmission wave and to propagating the free space transmission wave to the target enables on the one hand, the influence of the propagation direction of the irradiated free space transmission wave and, on the other hand, a provision of the transmission wave with a lowest possible power.

Advantageous embodiments and developments of the proximity sensor according to the invention are respectively the subject matter of the dependent device claims.

One embodiment provides that the waveguide has two separate waveguides for the transmission and receiving path. In this embodiment, the waveguide modes of the two waveguides are identical and the transmission wave also leads to a propagating wave in the free space in this embodiment. For the transmission wave, one waveguide is available, while the two waveguides can be used for the receiving wave.

Another embodiment provides that the two separate paths decoupled from one another are implemented by a circularly polarised waveguide transmission wave and a waveguide reflection wave circularly polarised in the other rotational direction. The rotation of the polarisation direction of the free space transmission wave takes place on the electrically conductive surface of the target.

The waveguide transmission wave is a right or left rotating circularly polarised wave, for example, while the waveguide reflection wave is a left or right rotating circularly polarised wave. The two wave types arise from rotation of the TE11 waveguide mode around the axis of the waveguide.

The substantial advantage of this embodiment is that the whole surface of the waveguide is available for both the transmission path and the receiving path. Because of the enlarged surfaces, both the irradiation and the receiving properties of the waveguide are advantageously improved. This property is grounded in the fact that the observed sensor head is a so-called aperture radiator. The aperture of the radiator thus corresponds to the active surface of the sensor head. According to the antenna theory, the ability of an aperture radiator to irradiate electromagnetic energy specifically in one spatial direction and to be able to receive is immediately determined by the size of the aperture and thus the active surface of the sensor head.

A development of this embodiment provides that a septum polariser is provided for providing the circularly polarised waveguide transmission wave and for uncoupling the circularly polarised waveguide transmission wave from the similarly circularly polarised waveguide reflection wave. The septum polariser already described above can be produced as a planar structure in a photolithographic process and thus directly integrated on a circuit board of an electronic system within the waveguide.

The waveguide can be formed in such a way that the course of the transmission factor qualitatively corresponds to that of the reflection factor. This case offers the advantage that only the evaluation of the transmission factor is sufficient to determine the distance, whereby the signal separation by a directional coupler can be omitted. In doing so, the embodiments contained in the detailed description relating to the reflection factor also apply to the transmission factor.

A propagating free space transmission wave is obtained by the comparatively simple excitation of the TE11 wave mode belonging to the one circular cylindrical waveguide of the waveguide transmission wave.

The waveguide can be formed in principle to be rectangular or circular cylindrical. An advantageous embodiment provides that the waveguide is formed to be circular cylindrical. As a result, the proximity sensor according to the invention can be implemented cost-effectively with the present components of the known inductive proximity sensors. Furthermore, an immediate exchange of a conventional inductive sensor for the proximity senor according to the invention is possible without constructive changes to the measuring apparatus having to be undertaken.

Another advantageous embodiment of the proximity sensor according to the invention provides that, at the aperture on the front end of the waveguide, a dielectric window is arranged. The dielectric window prevents the penetration of dirt into the waveguide. Alternatively or, in particular, additionally, the whole waveguide can be filled with a dielectric material. This measure makes it possible to fix a preferably present wave type converted directly in the waveguide.

Coupling the transmission wave into the waveguide with a predetermined wave mode is achieved most easily with a wave mode transformer that converts the circuit transmission wave into the waveguide transmission wave. With such a wave mode transformer, for example the previously mentioned septum polariser that is formed in a step-manner, a circularly polarised waveguide transmission wave can also be provided and a circularly polarised waveguide reflection wave can be decoupled.

To determine a measure for the distance, for example from the reflection factor, a quadrature mixer or alternatively the 6-gate technique can be particularly advantageously used because of the availability as finished technical solutions.

The method according to the invention for measuring the distance of a target provides that an output signal of a microwave oscillator is provided as a transmission wave which is irradiated in the direction of the target as a free space transmission wave is reflected by the target, which is electrically conductive or at least has an electrically conductive surface, as free space reflection wave and received as a reflection wave, wherein the distance is determined from the transmission wave and the reflection wave, wherein the transmission wave is guided in a waveguide as a waveguide transmission wave and wherein coupling the transmission wave into the waveguide takes place with a wave mode that leads to detaching the waveguide transmission wave at the aperture on the front end of the waveguide and to propagating the free space transmission wave to the target. The method according to the invention is characterised in that the transmission wave is guided in the waveguide in a transmission path as a waveguide transmission wave and the reflection wave is guided as a waveguide reflection wave in the at least one receiving path electromagnetically decoupled from the transmission path.

The method according to the invention can alternatively be called a method for operating the proximity sensor according to the invention. Thus, the advantages already presented relating to the proximity sensor according to the invention are also present with the method according to the invention.

Advantageous embodiments and developments of the method according to the invention for measuring the distance of a target are respectively the subject matter of the dependent method claims.

An advantageous embodiment of the method according to the invention provides that only the reflection factor or only the transmission factor is used for determining the distance.

Another advantageous embodiment of the method according to the invention provides that, in addition to the reflection factor, the transmission factor is used for determining the distance. As a result, a plausibility check of the measuring result is possible.

It was experimentally established that the determination of the distance from the transmission factor is more robust towards external disturbing influences than the determination of the distance from the reflection factor.

Advantageously, the TE11 mode belonging to a circularly cylindrical waveguide is provided as the wave mode.

The method according to the invention enables the determination of the distance with only one frequency of the transmission wave and only one predetermined wave mode.

An alternative or additional embodiment provides that an adjusting of the microwave oscillator takes place alternately on at least two different frequencies of the transmission wave to determine the distance. Thus, determining the distance on at least two different frequencies of the transmission wave and with one single wave mode can take place.

An embodiment provides that at least one second wave mode is provided for coupling the transmission wave into the waveguide alternately to the first wave mode.

With this measure, it is provided according to another alternative or according to an additional embodiment that the determination of the distance on one single frequency of the transmission wave and at least in two different wave modes takes place.

With this embodiment, for example, at least one such further wave mode is provided that leads to an extensively evanescent field distribution in front of the waveguide that clearly differs from the propagated free space transmission wave, such that the difference is as great as possible. For this, the TM01 mode belonging to the circularly cylindrical waveguide is particularly suitable.

Determining the distance in at least two different manners is possible because of the embodiments described, such that the results determined from the different manners can also be made plausible and/or clarity can be produced.

An immediate measure for the distance of the target from the aperture of the waveguide is obtained by means of a reverse calculation of the determined reflection factor from the transmission wave and the reflection wave on the reflection factor at the aperture of the waveguide. The reverse calculation preferably takes place with a conformal mapping which is angle-preserving such that the essential phase information does not get lost.

In doing so, the measure for the distance can already be obtained only from the phase of the reflection factor. Preferably, furthermore, the magnitude of the reflection factor is taken into consideration. In particular, then, a clear determination of the distance from the phase of the reflection factor can be obtained by means of the magnitude of the reflection factor when there is ambiguity of the phase of the reflection factor within the predetermined measuring region.

Advantageous developments provide, on the one hand, a rough calibration and, where appropriate, additionally a fine calibration.

According to one embodiment, it can be provided that the distance is provided as an analogue signal.

Additionally or alternatively, it can be provided according to one embodiment that a switching signal is provided that signals that a certain distance has been exceeded or has not been reached.

Further advantageous embodiments and developments of the proximity sensor according to the invention and the method according to the invention for measuring the distance of a target arise from the following description.

Exemplary embodiments of the invention are depicted in the drawing and explained in more detail in the description below.

BRIEF DESCRIPTION OF THE FIGURES

FIG. 10 shows a waveguide in which the uncoupling of the signal paths takes place by means of the circularly polarised waves, FIG. 11 shows a top view on the aperture of the waveguide with an indicated circularly polarised free space transmission wave and with an indicated free space reflection wave circularly polarised in the opposing direction and FIG. 12 shows a top view on the target, the distance of which is to be measured, with an indicated free space target transmission wave and an indicated free space reflection wave.

DETAILED DESCRIPTION OF THE EXEMPLARY EMBODIMENTS

Figure 1:
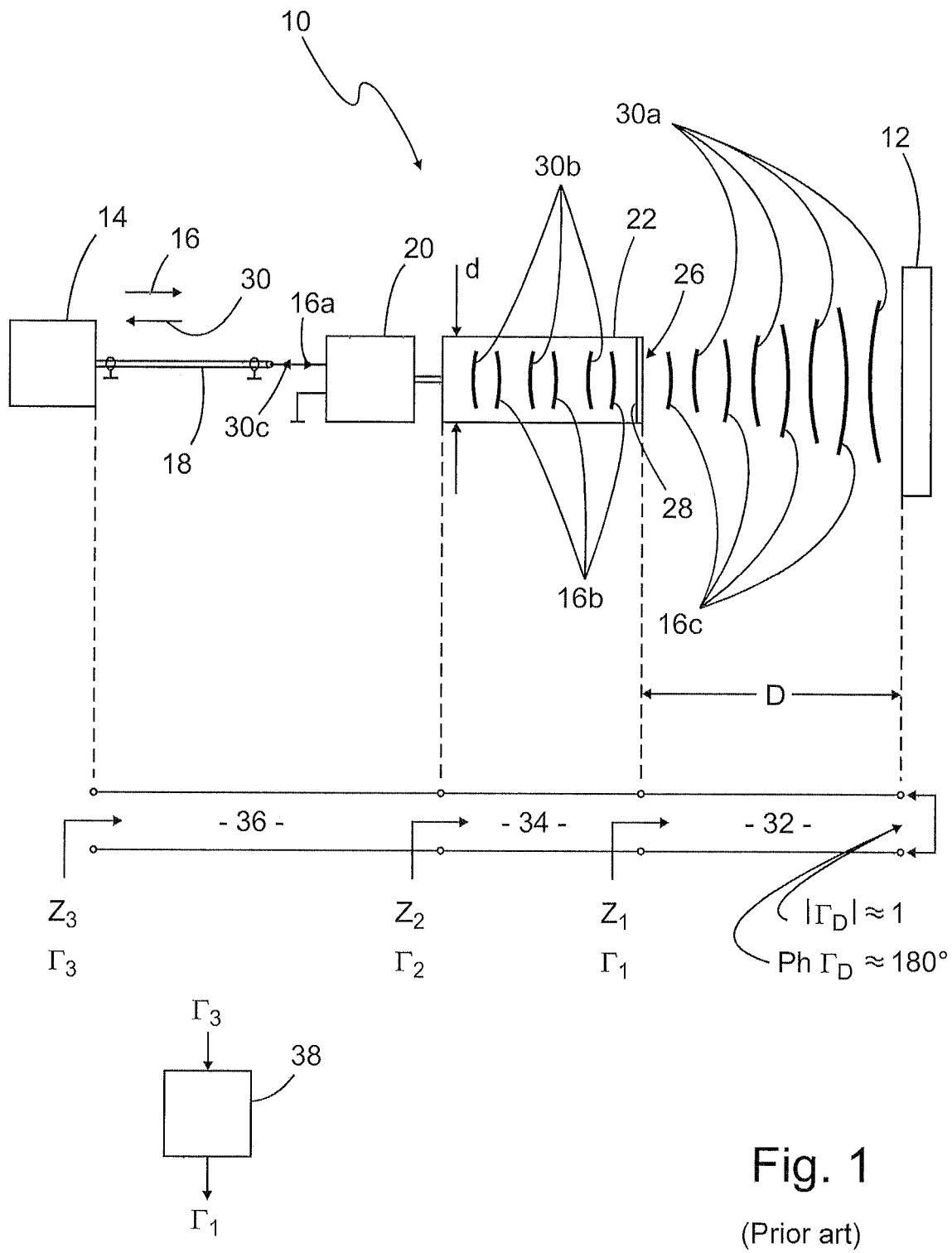
FIG. 1 shows a sketch of a proximity sensor according to the invention.

FIG. 1 shows a sketch of a proximity sensor 10 corresponding to the prior art according to the non-pre-published patent application PCT/DE2013/000342 that detects the distance D between the proximity sensor 10 and a target 12.

The known arrangement serves as a basis for the following description which, however, similarly characterises the proximity sensor according to the invention. The constructive differences between the known arrangement and proximity sensor according to the invention are exposed in connection with the description of the arrangements shown in FIGS. 8-12.

A signal processing arrangement 14 provides a transmission wave 16 that is guided in a high frequency wire 18 as a wire transmission wave 16a up to a wave mode transformer 20. The wave mode transformer 20 that transfers the wire-bound dual wire wave mode (QTEM) of the wire transmission wave 16a into a predetermined waveguide wave mode, couples the wire transmission wave 16a into a waveguide 22.

The waveguide 22 has a predetermined cross section that can be rectangular or circular cylindrical, for example. Where necessary, a circular cylindrical construction is advantageous, wherein an immediate exchange of present inductive proximity sensors with circular cylindrical housings compared to the proximity sensor 10 according to the invention in a simple way becomes possible. In particular, available brackets can be used.

The excited waveguide transmission wave 16b extends in the waveguide 22, reaches an opening or aperture 26 on the front end of the waveguide 22 and determines the field distribution in the region of the aperture 26.

The waveguide transmission wave 16b running in the waveguide 22, the wave fronts of which being sketched in FIG. 1, appears at the aperture 26 of the waveguide 22 as an irradiated dominating free space transmission wave 16c by which the wave fronts are also sketched. The aperture 26 of the waveguide 22 corresponds to the active surface of the proximity sensor 10.

The waveguide 22 can have a dielectric window 28 at its aperture 26 on the front end. The dielectric window 28 prevents the penetration of dirt into the waveguide 22. As the material for the dielectric window 28, dielectric materials can be considered, which have as small as possible transmission loss for the waveguide transmission wave 16b. Suitable materials are Teflon or aluminium oxide, for example. Here, the electric permittivity of the material plays a role as the selection criterion since this value, along with the diameter d, also includes the resulting wave impedances of the waveguide wave modes.

The wave impedance $ZHL_{\in_r}$ of a waveguide filled with dielectric material emerges from the wave impedance $ZHL_{\in_0}$ of the unfilled waveguide:

$$ZHL_{\varepsilon r} = \frac{ZHL_{\varepsilon 0}}{\sqrt{\varepsilon r}}$$

In principle, the values should be set in such a way that the characteristic wave impedance of the propagated mode of the waveguide transmission wave 16b corresponds to the wave impedance of the free space $Z_{F0}=377\Omega$, in front of the waveguide 22. As a result, it is ensured that a reflection-weak transfer from the waveguide transmission wave 16b to the irradiated free space transmission wave 16c takes place.

Alternatively or additionally to the embodiment with the dielectric window 28, the waveguide 22, where appropriate including the wave mode transformer 20, can be filled with the dielectric material. This embodiment has proved to be particularly advantageous because, in doing so, the wave mode transformer 20 can be mechanically fixed in the waveguide 22. In FIG. 1, the embodiment is shown wherein the wave mode transformer 20 is positioned, seen from the direction of the transmission wave 16, outside the waveguide 22 for depiction-technical reasons.

The irradiated free space transmission wave 16c meets the target 12 which is at the determined distance D in front of the aperture 26 of the waveguide 22. The proximity sensor 10 according to the invention determines and provides a measure for the distance D between the aperture 26 of the waveguide 22 and the target 12.

The target 12, which is either made completely from an electrically conductive material or has at least one surface made of an electrically conductive material, reflects the free space transmission wave 16c running outside the waveguide 22, such that a reflection wave 30 occurs that is present at first in the form of a free space reflection wave 30a from which the wave fronts are sketched in FIG. 1. The free space reflection wave 30 goes through the aperture 26 back into the waveguide 22 in which the reflection wave 30 is present as a waveguide reflection wave 30b, wherein, again, the wave fronts of the waveguide reflection wave 30b are sketched.

The waveguide reflection wave 30b is transferred in the wave mode transformer 20 into a wire reflection wave 30c and go through into the signal processing arrangement 14 as a reflection wave 30.

The whole arrangement between the signal processing arrangement 14 and the target 12 can be seen in sections as a high frequency wire that is schematically sketched in the lower partial section of FIG. 1. An input impedance $Z_1$, $Z_2$, $Z_3$ or a reflection factor $\Gamma_1$, $\Gamma_2$, $\Gamma_3$ can be allocated to every section. Ideally, a short circuit is on the electrically conductive surface of the target 12, said short circuit leading to an magnitude of the reflection factor $\Gamma_D$ of at least approximately 1 and to a phase shift of the phase Ph $\Gamma_D$ between the free space transmission wave and the free space reflection wave 30a from at least approximately 180°.

According to one embodiment, a measure for the distance D can be determined by means of measuring the impedance $Z_1$ or the reflection factor $\Gamma_1$ that is present at the aperture of the waveguide 22. Depending on the known frequency of the transmission wave 16, the phase Ph $\Gamma_1$ of the reflection factor $\Gamma_1$ depicts an initially ambiguous measurement for the distance D.

In the exemplary embodiment shown, the first impedance $Z_1$ or the first reflection factor $\Gamma_1$ appears at the aperture 26 of the waveguide 22. Furthermore, it is assumed that air is present in the free space, the wave impedance of which being at least approximately 377 Ohm. However, a different medium, for example a dielectric wall, can be provided instead of air, wherein then the wave impedance is correspondingly altered.

The immediate measuring of the reflection factor $\Gamma$ at the aperture 26 of the waveguide 22, concretely as a measurement of the first reflection factor $\Gamma_1$, would technically be very complex. Preferably, therefore, the third reflection factor $\Gamma_3$ is measured at the start of the high frequency wire 18 at the position of the signal processing arrangement 14. The substantial advantage is that measuring can be carried out within the signal processing arrangement 14.

According to line theory, the whole arrangement between the signal processing arrangement 14 and the target 12 can be depicted as a cascade of different wire sections 32, 34, 36. The wire sections 32, 34, 36 are formed by the free space dependent on the distance D, the waveguide 22 and the high frequency wire 18, ignoring the wave mode transformer 20.

Every wire section 32, 34, 36 has a specific wave impedance, an (input) impedance $Z_1$, $Z_2$, $Z_3$ and an (input) reflection factor $\Gamma_1$, $\Gamma_2$, $\Gamma_3$.

Thus, the reflection factors $\Gamma_1$, $\Gamma_2$, $\Gamma_3$ are each based on the wave impedance of the corresponding section 32, 34, 36. For example, the first reflection factor $\Gamma_1$ emerges from the (input) impedance $Z_1$ that is determined at the aperture 26 of the waveguide 22 looking in the direction of the target 12, and from the wave impedance of the free space.

If, in the first wire section 32, a planar wave is local assumed from the free space, the phase of the first reflection factor $\Gamma_1$ has a sectionally linear functional connection to the distance D. With increasing distance D, a monotonous falling function emerges for the magnitude of the first reflection factor $\Gamma_1$.

The nearest wire section 34 that corresponds to the waveguide 22 transforms the impedance $Z_1$ into the impedance $Z_2$.

The third (input) reflection factor $\Gamma_3$ of the wire section 36, of the high frequency wire 18 that, in turn, arises from a transformation from $Z_2$ is easy to measure.

By means of a conformal mapping 38, a reflection factor corresponding to $\Gamma_1$ that expresses a measure for the distance D can be concluded from the third reflection factor $\Gamma_3$ that is determined in the signal processing arrangement 14. The reflection factor $\Gamma$ is a complex size and is defined as a quotient of the reflection wave 30 and the transmission wave 16 that fit the same gate. The reflection factor $\Gamma_1$ can, for example, be determined by means of the following context according to a conformal mapping, wherein $Z_{ref}$ is a normalising impedance that can be set by a rough calibration described below:

$$\Gamma_1 = \frac{Z_3 - Z_{ref}}{Z_3 + Z_{ref}}$$

where $$Z_{ref} = a + jb$$

In order to be able to detect the largest possible distances D, according to an exemplary embodiment, as few as possible evanescent contributions to the free space transmission wave 16c in the region in front of the aperture 26 of the waveguide 22 are to be present, since these quickly subside with increasing distance and already only provide a small contribution to the field distribution in a small distance D. It is therefore provided that the free space transmission wave 16c, at least at times, has a dominating contribution to a planar wave propagating in the direction of the target 12 to determine the distance D.

The field distribution in the aperture 26 is predetermined by the wave mode distribution in the waveguide 22. Therefore, a wave mode is excited that explicitly extensively leads to a free space transmission wave 16c propagating in the direction of the target 12. The waveguide transmission wave 16b should then transfer into the free space transmission wave 16c with as few reflections as possible at the aperture 26. Additionally, the wave impedance of the waveguide wave mode has to correspond to the wave impedance of the free space as much as possible as well as the field distribution thereof having to correspond to the one planar wave as far as possible. These conditions can, for example, be fulfilled by the base wave mode of a rectangular or circular cylindrical waveguide 22.

Corresponding to the valid norm for inductive proximity sensors, a circular cylindrical constructive shape is predetermined. With an analogous application of the norm for the proximity sensor 10, this means that the waveguide 22 is preferably implemented as a circular cylindrical waveguide 22 having, preferably, a circular cross-section. Without considering the norm that, strictly speaking, only applies to inductive proximity sensors, a freely selectable different cross-section of the waveguide 22, a rectangular cross-section for example, can, however, also be provided, purely in principle.

In FIGS. 2a-3b, two different field distributions are depicted as an example of a circular cylindrical waveguide 22. In the two examples, the field distributions emerged from the monomodal excitation in the circular cylindrical waveguide 22.

Figure 2A:
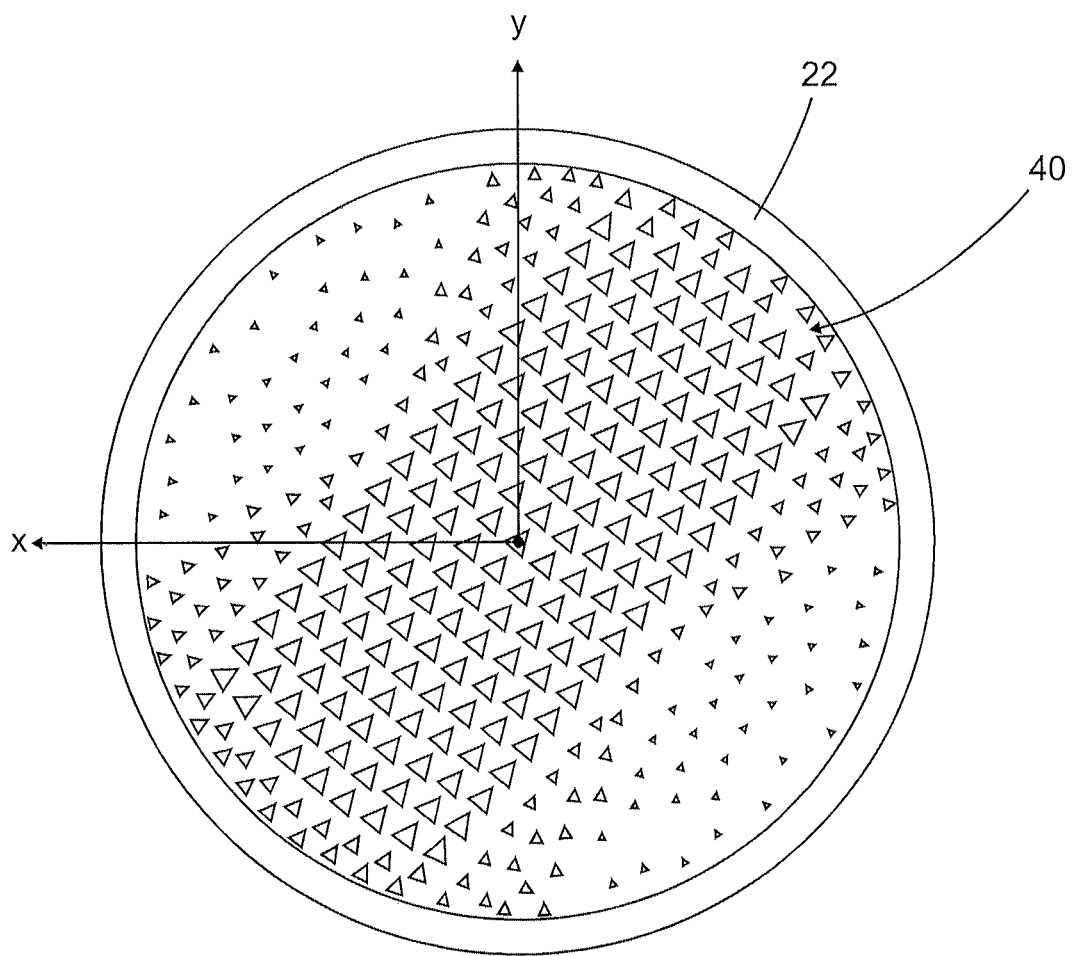
FIG. 2a shows a diagram of the electric field strength in a cross section of a waveguide with a first excitation, FIG. 2b schematically shows a resulting field strength distribution in the waveguide and in the free space with an excitation according to FIG. 2a, FIG. 3a shows a diagram of the electric field strength in a cross section of a waveguide with a second excitation, FIG. 3b schematically shows a resulting field strength distribution in the waveguide and in the free space with an excitation according to FIG. 3a, FIG. 4a shows a block wiring diagram of a signal processing system.

FIG. 2a shows an excitation 40 in the TE11 mode belonging to a circular cylindrical waveguide. In FIG. 2a, the electric field strength 40 is sketched in a cross-section of the waveguide 22, the magnitude and direction of which are symbolised by the triangles indicated.

Figure 2B:
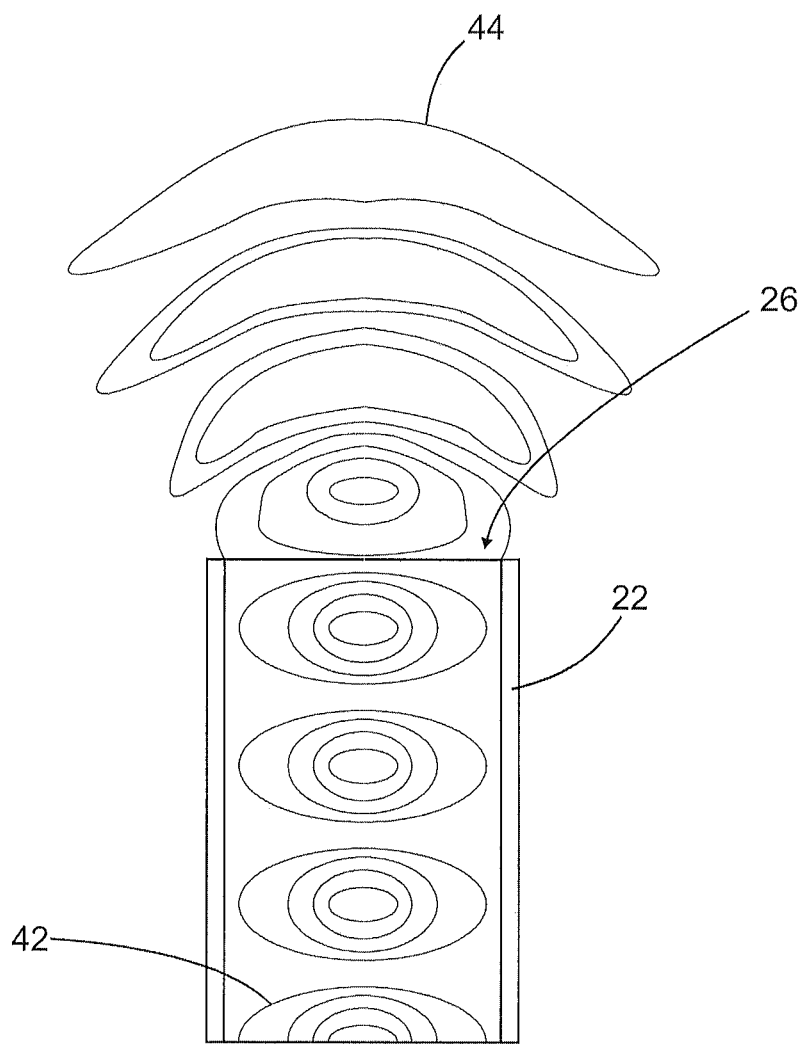

The corresponding field distribution 42 inside the waveguide 22 and the field distribution 44 in the free space in front of the aperture 26 of the waveguide 22 are depicted in FIG. 2b in a top view. The excitation in the TE11 mode leads predominantly to a desired free space transmission wave 16c propagated in the direction of the target 12. Such a propagating free space transmission wave 16c should provide the proximity sensor 10 at least at times.

Figure 3A:
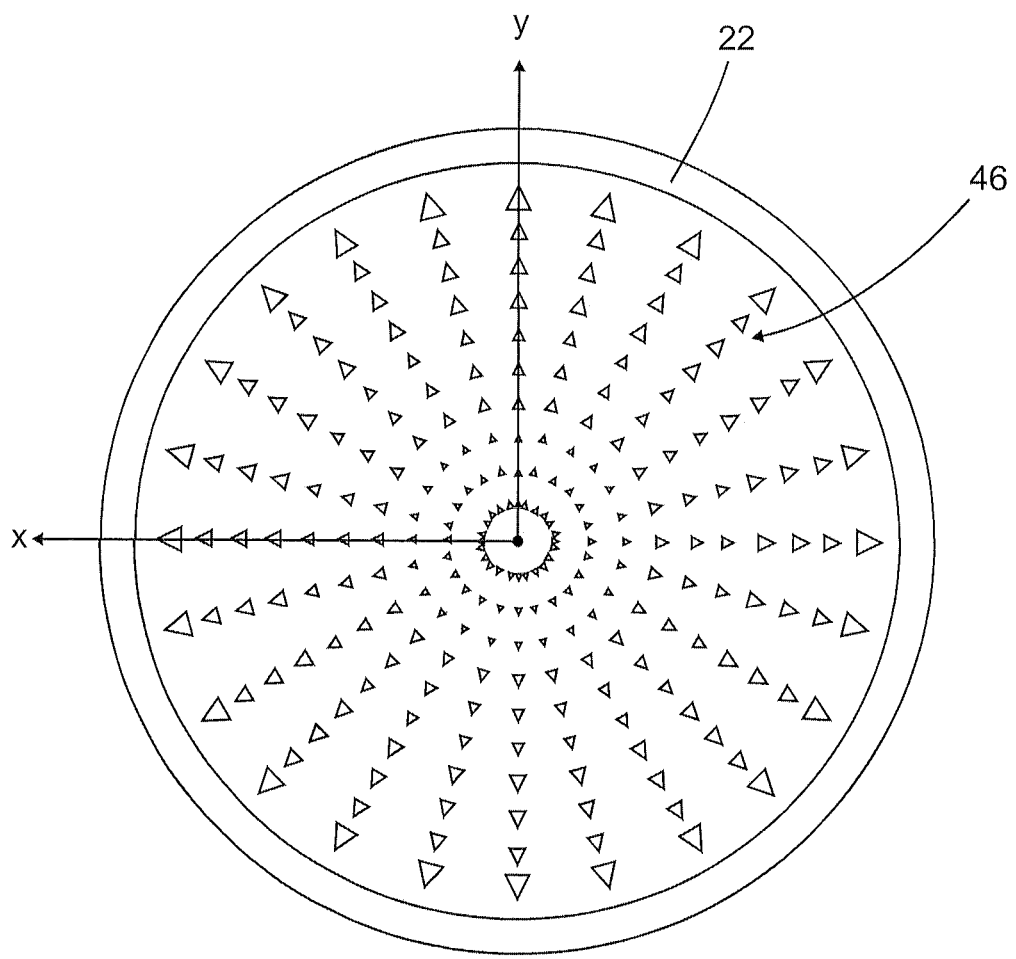

FIG. 3a shows a second excitation in the TM01 mode belonging to a circular cylindrical waveguide. The electric field strength 46 is sketched in FIG. 3a in a cross-section of the waveguide 22, the magnitude and direction of which are symbolised by the triangles indicated.

Figure 3B:
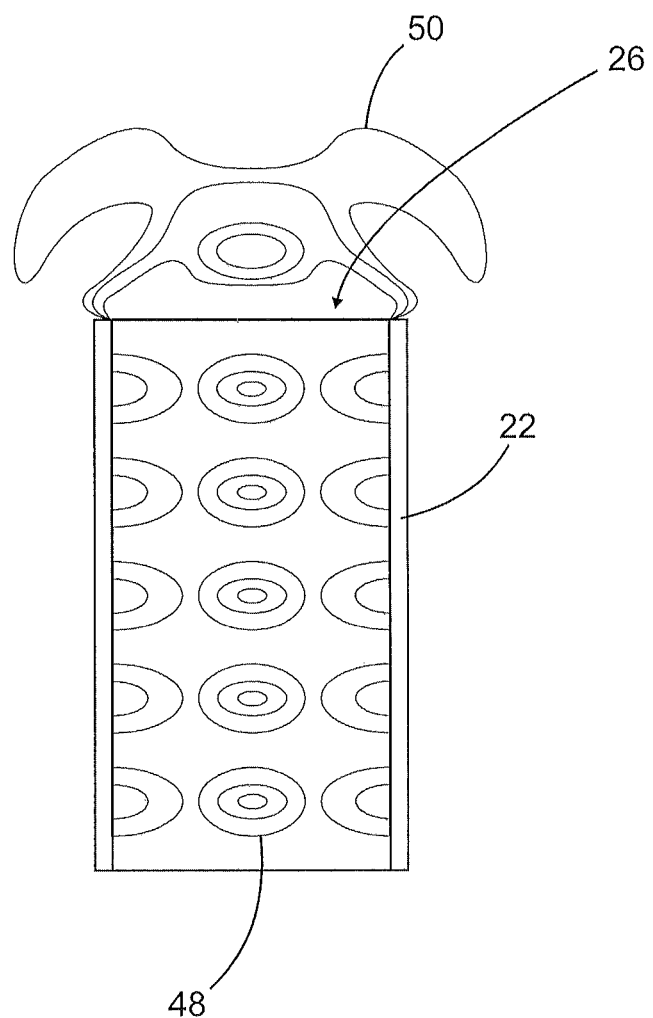

The corresponding second field distribution 48 inside the waveguide 22 and the second field distribution 50 in the free space in front of the aperture 26 of the waveguide 22 are depicted in FIG. 3b in a top view. The excitation in the TM01 mode leads to an extensively evanescent field distribution 50 in the free space in front of the aperture 26.

Figure 4A:
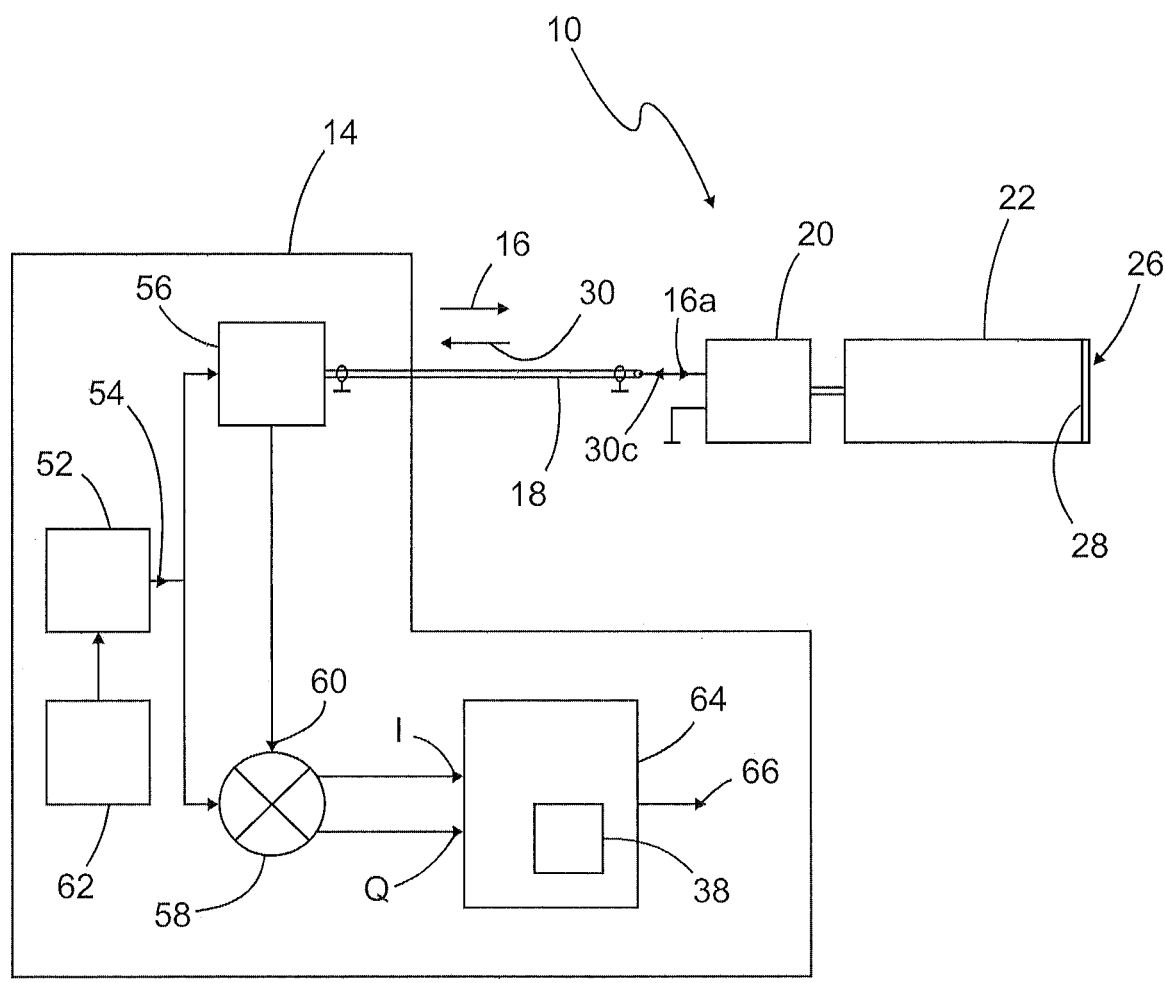
FIG. 4b shows a block wiring diagram of a quadrature mixer.
FIG. 4c shows a block wiring diagram of a 6-gate technique.

The determination of the reflection factor $\Gamma$, especially the third reflection factor $\Gamma_3$ takes place in the signal processing arrangement 14, the block wiring diagram of which is shown in FIG. 4a.

The parts shown in FIG. 4a that correspond to the parts shown in FIG. 1 are provided with the same reference numbers.

The signal processing arrangement 14, the components thereof being able to be arranged in the back end of the waveguide 22 to correspond to an advantageous embodiment, contains a microwave oscillator 52, the output signal 54 of which is provided both for a directional coupler 56 and for a quadrature mixer 58. The directional coupler 56 leads the output signal 54 of the microwave oscillator 52 via the high frequency wire 18 further on the wave mode transformer 20. Furthermore, the directional coupler 56 uncouples the reflection wave 30 and further leads a reflection signal 60 corresponding to the reflection wave 30 on the quadrature mixer 58.

Where necessary, a switch 62 is provided. The switch 62 enables switching from a first frequency of the output signal 54 of the microwave oscillator 52 to at least one further frequency.

In the directional coupler 56, the transmission wave 16 is separated from the reflection wave 30. The directional coupler 56 can be implemented in planar wire techniques, for example in microstrip technique.

The reflection factor Γ, especially the third reflection factor $\Gamma_3$, can be determined on the basis of the separated waves 16, 30, for example by means of quadrature mixing in the quadrature mixer 58.

Figure 4B:
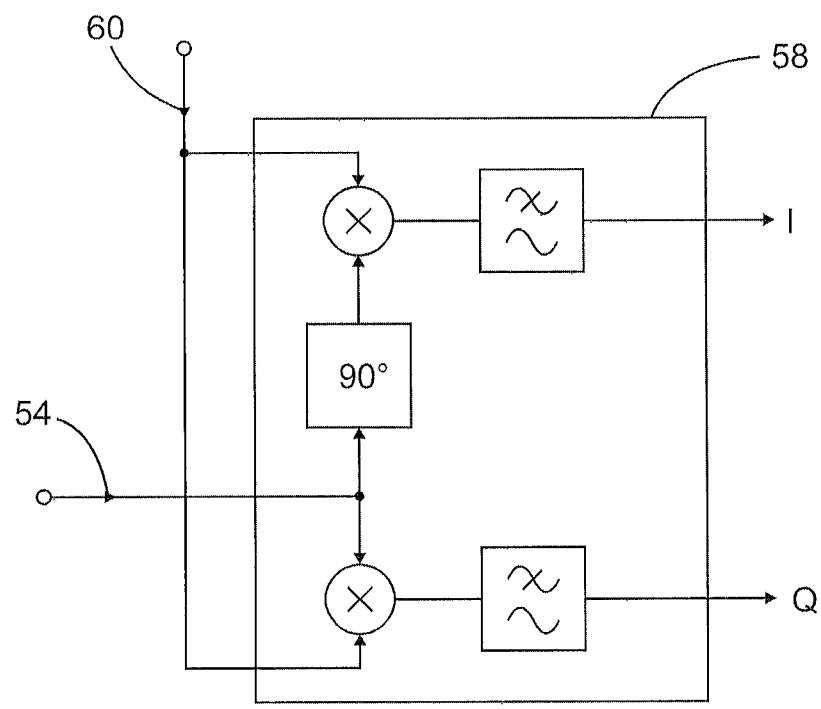

A block wiring diagram of the quadrature mixer 58 is shown in FIG. 4*b*. The quadrature mixer 58 forms an in-phase and a quadrature component I, Q by mixing the reflection wave 30 with the transmission wave 16. The quadrature mix enables the determination of real and imaginary parts of the complex enveloping of the signal to be analysed, here of the reflection signal 60, based on amplitude and phase of the reference signal, here of the output signal 54.

Figure 4C:
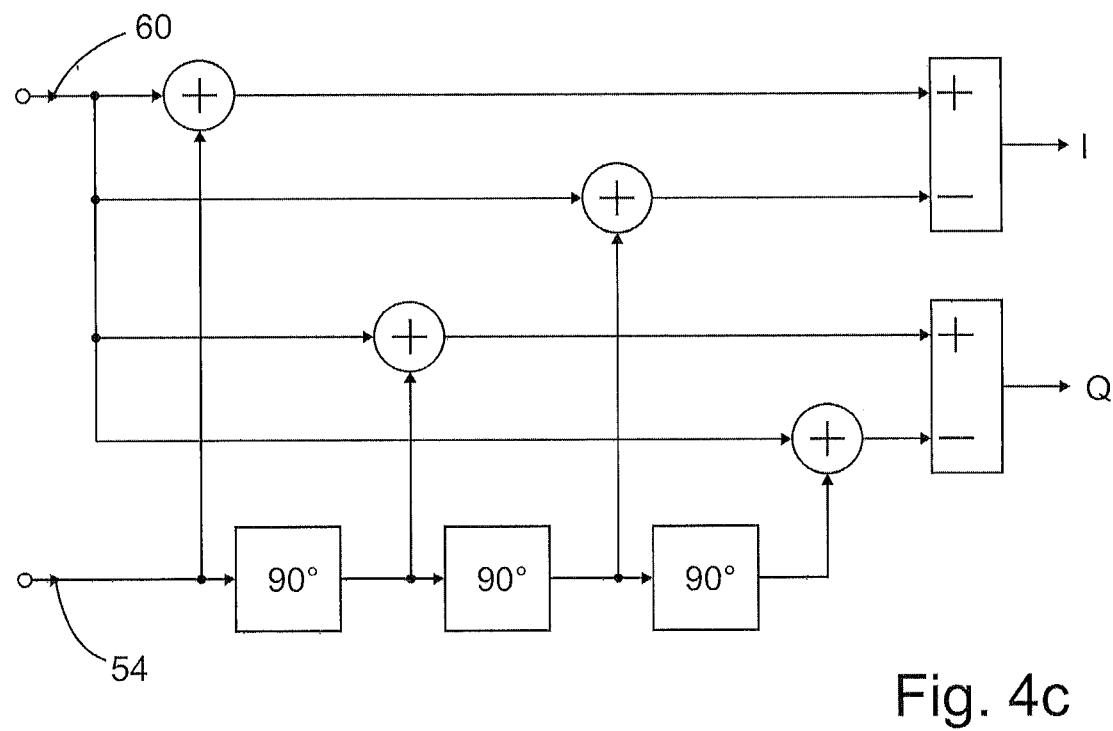

An alternative opportunity to determine the reflection factor Γ provides the 6-gate technique. An implementation example of the 6-gate technique is shown in FIG. 4*c*. The 6-gate technique also provides the in-phase and quadrature components I, Q.

A further alternative opportunity for determining the reflection factor Γ is possible by way of measuring the standing waviness along wiring sections.

The two components I, Q are supplied to a calculation unit 64 that, as a result, determines the complex reflection factor Γ, especially the third reflection factor $\Gamma_3$, and preferably adopts a calibration and a measurement evaluation described further below.

The calculating unit 64 preferably further contains the conformal mapping 38 for transforming the complex third reflection factor $\Gamma_3$ into the first complex reflection factor $\Gamma_1$. An output signal 66 of the calculating unit 64 can be evaluated immediately as a measure for the distance D.

According to an advantageous embodiment of the proximity sensor 10, the microwave oscillator 52, the wave mode transformer 20, the directional coupler 56, the quadrature mixer 58 and the calculating unit 64 are arranged on a single circuit board that is produced from base material that is capable of high frequency, for example fibreglass reinforced Teflon.

Following the measuring principle, the conformal mapping 38 is provided that depicts the first reflection factor $\Gamma_1$ in the complex plane in a spiral with the reference wave impedance as the central point, corresponding to normalising the wave impedance. Thus, all planar waves in the free space between the aperture 26 and the target 12 are combined in a dominating progressive wave. Since this wave loses power by losses and irradiation, both its propagation constant and its wave impedance are complex, as a result of which a complex reference wave impedance ensues.

If the reference wave impedance of the first reflection factor $\Gamma_1$ corresponds to the wave impedance of an equivalent wire, the first reflection factor $\Gamma_1$ of a short-circuited wire in complex plane describes a spiral that is run through with increasing distance from the short-circuit in the direction of inside of the spiral.

Without considering the further influences of the wave mode transformer 20, the course of the third reflection factor $\Gamma_3$ describes a spiral in the complex reflection factor plane as a function of the distance D, the location thereof resulting from the individual transformations. Although, in principle, there is still one spiral course, as a result, a complicated course can emerge for the third complex reflection factor $\Gamma_3$ in the usual polar coordinate depiction. To illustrate this, it should simply be assumed that the spiral is entirely in the first quadrant of the Cartesian reflection factor plane. By assuming this, a value range of 0 to π/2 for the angle of the reflection factor $\Gamma_1$ in polar coordinates ensues. From the phase course that was previously linearly falling with the increasing distance D, now a curve arises that has sectionally cumulative phase values without phase gaps. Similarly, different maximums and minimums in terms of the reflection factor $\Gamma_3$ emerge from the transformations. Finally, the aim of the conformal mapping 38 is to eliminate the influence of the impedance transformations by normalising and thus to shift the central point of the spiral course into the origin of the reflection factor plane.

Figure 5A:
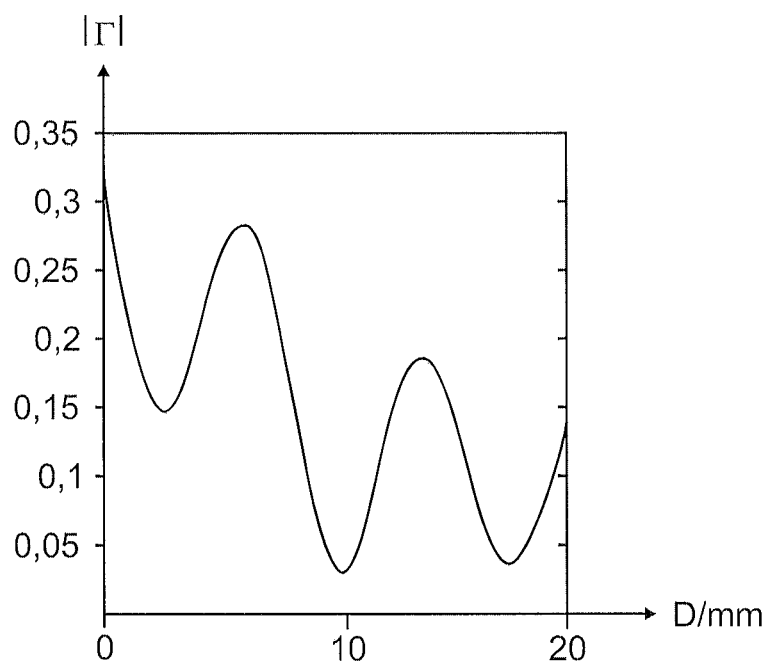
FIG. 5a shows a magnitude of a measured complex reflection factor.
Figure 6A:
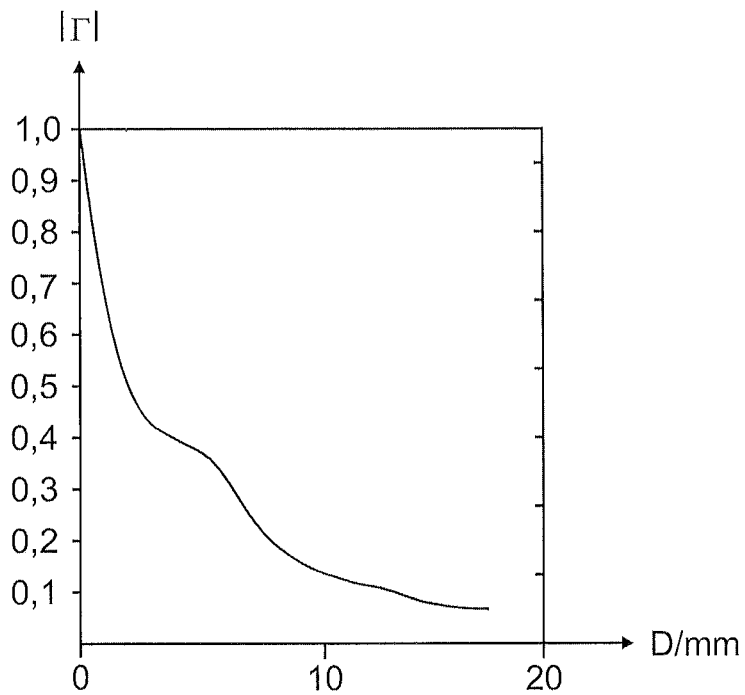
FIG. 6a shows a magnitude of a measured complex reflection factor after a conformal mapping.

In FIG. 5*a*, the magnitude of the third reflection factor $\Gamma_3$ is shown in front of the conformal mapping and, in FIG. 6*a*, after the conformal mapping.

Figure 5B:
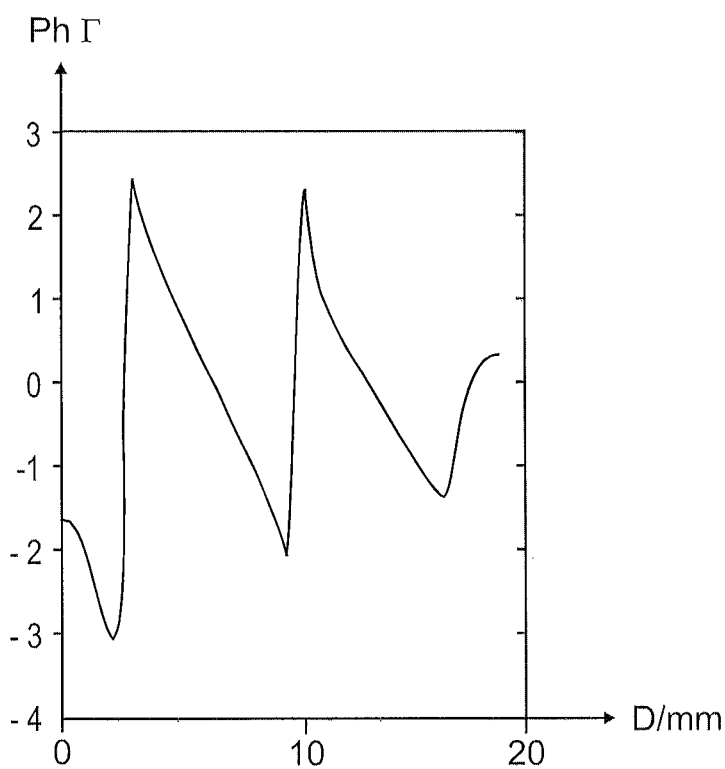
FIG. 5b shows a phase angle of a measured complex reflection factor.

In FIG. 5*b*, the phase Ph $\Gamma_1$ of the third reflection factor $\Gamma_3$ is shown before the conformal mapping and, in FIG. 6*b*, after the conformal mapping.

As can be seen, a monotonously falling function and a linear relationship between the distance D and the phase Ph $\Gamma_3$ emerges after the conformal mapping for the magnitude of the third reflection factor $\Gamma_3$.

Figure 7:
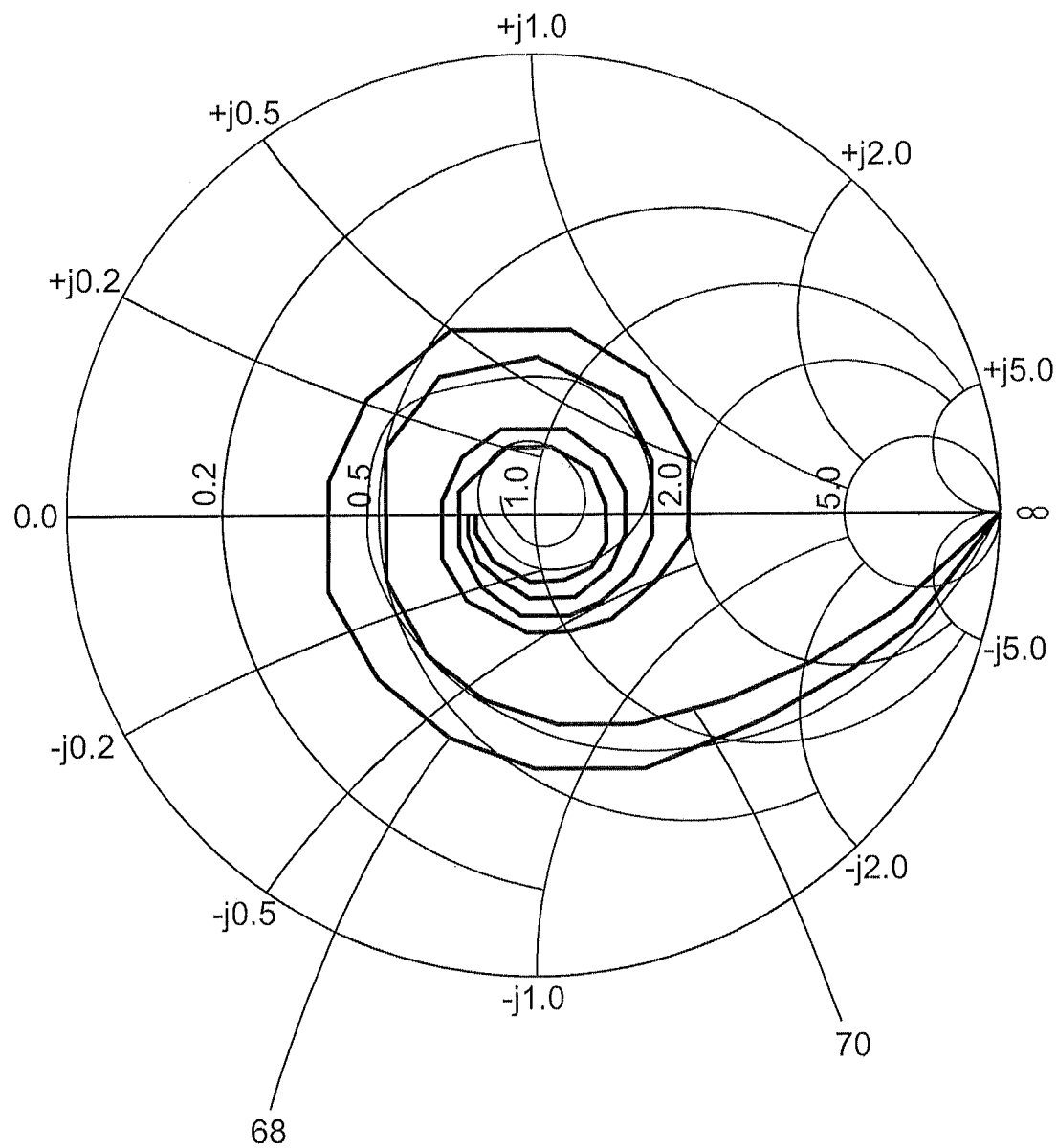

In FIG. 7, the complex third reflection factor Γ, especially the third reflection factor $\Gamma_3$ is shown in a Smith diagram, wherein two curve courses are shown that apply to two different frequencies of the transmission wave 16 between which it can be periodically switched by means of the switch 62.

The distance D of the target 12 can be immediately concluded from the linear phase course by means of the phase constants of the transmission wave 16. As can be seen in FIG. 7, the correlation between distance D and the phase Ph Γ is not initially clear because of the periodicity of the phase course Ph Γ when the detection region of the proximity sensor 10 exceeds half the wavelength of the transmission wave 16. In order to also be able to implement a clear solution for a greater measuring region of the distance D, additionally the reference course of reflection factor Γ is evaluated and thus the ambiguity of the pure phase evaluation is removed. This evaluation is successfully carried out since the conformal mapping 38 depicts the magnitude of determined first refection factor $\Gamma_1$ on a monotonous falling course.

For realising the sensor concept, according to an advantageous embodiment, at least a rough calibration, however preferably a rough and a fine calibration are provided.

Figure 6B:
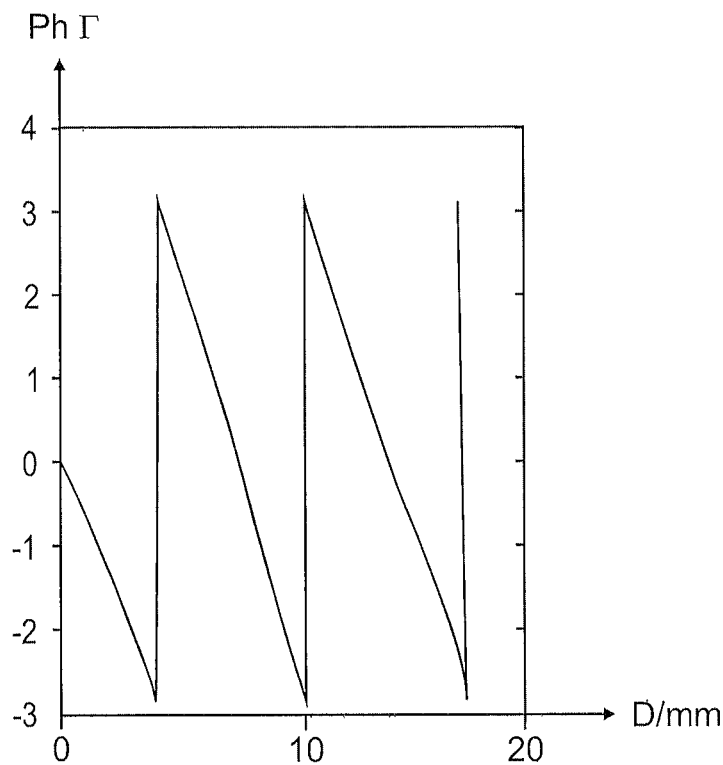
FIG. 6b shows a phase angle of a measured complex reflection factor after a conformal mapping and FIG. 7 shows a measured reflection factor in two different frequencies after a conformal mapping.

With the rough calibration for the conformal mapping:

$$\Gamma_1 = \frac{Z_3 - Z_{ref}}{Z_3 + Z_{ref}}$$

the necessary normalisation impedance:

$$Z_{ref} = a + jb$$

is determined. As a result of the rough calibration, $\Gamma_1$ describes a spiral around the origin of the complex reflection factor plane, whereupon a monotonously falling reflection factor magnitude and an approximately linearly falling phase, as shown in FIGS. 6*a* and 6*b*, appear. Although the phase runs in a manner that looks to be linear, small deviations from this ideal course are almost unavoidable. The aim of the preferably additionally provided fine calibration is, on the one hand, to approach these deviations through a polynomial that subsequently provides the measuring evaluation for failure compensation. On the other hand, during the fine calibration, a polynomial description of $|\Gamma_1(D)|$ is developed, by means of which the ambiguity of the phase measuring is removed.

The basis of the two calibrations form values (reference values) of the complex reflection factor $\Gamma_3$ that is received and stored once after producing sensor along the detection region D. The number of value pairs to be obtained is thus mainly determined by the exactness of the sensor that is to be achieved.

The rough calibration can, for example, be carried out in the following manner:

In order to be able to take all parasitic influences along the wire sections 36, 34, 32 into account, it is not attempted to analytically determine the normalisation impedance from the equivalent circuit diagram, but to obtain $Z_{ref}$ directly from the reference values of the finished sensor. Starting with:

$$Z_{ref}=a+jb,$$

the conformal mapping is $$\Gamma_1 = \frac{Z_3 - a - jb}{Z_3 + a + jb}$$

wherein a and b are determined in such a way by an iterative process that $|\Gamma_1|$ falls monotonously with increasing distance D.

To do so, $|\Gamma_1(D)|$ is considered as a function of D with the two parameters a and b. The demand for monotony is of equal important as the disappearance of the local maximum of $|\Gamma_1(D)|$. The k position $D_i \neq 0$, from which this function attains its maximum, can be found by means of:

$$\frac{d|\Gamma_1(D_i)|}{dD} = 0$$

and the condition:

$$\frac{d^2|\Gamma_1(D_i)|}{d^2 D} < 0$$

The aim of the numerical optimisation process is now to determine a and b in such a way that $|\Gamma_1(D)|$ becomes minimal and, in an ideal case, k=0 ensues.

As a starting value of the iteration, $$Z_{ref} = \lim_{D \to \infty}(Z_3)$$

can be provided for selection and thus for calculating $|\Gamma_1|$.

According to one embodiment it is provided to form the wave mode transformer 20 in such a way that this directly performs an impedance transformation of $Z_1$, whereby the conformal mapping can be greatly simplified or even omitted completely with.

The preferably additionally provided fine calibration can, for example, be carried out as in the following manner:

In the first step of the fine calibration, an interpolation polynomial or the function $|\Gamma_1(D)|$ is developed, the degree of which determines the quality of the approximation. The degree of the polynomial is, in turn, limited by the number of development points, which here are the measured reference points. Since, however, any number of points can be received in a measuring technical manner, an interpolation polynomial can also be found for any exactness. The purpose of this polynomial is to carry out a rough measuring of the distance D by means of the measured reference of the reflection factor F. This measuring serves only to determine the correct interval of the phase.

The non-linearities that arise in the phase course in practice despite the conformal mapping form directly on the exactness to be expected with the determination of the distance D, To reduce the measuring errors, a linearisation following behind is thus carried out preferably downstream when determining the distance D.

Based on the phase course of the reflection factor $\Gamma$ after the conformal mapping, the inconstant phase course is transferred into a constant and clear function by means of $|\Gamma|$. The phase values at the individual reference positions are determined by the sensor evaluation and determines the difference between the real value and the desired value. All deviations of the phase along the detection region are again depicted by a polynomial. Here, an arbitrarily high degree and thus an arbitrary exactness can be achieved by an arbitrary number of measuring points.

If the polynomial is determined and stored, as a result, with the actual determination of distance D, the deviation of the exact phase can be determined and the measuring result can be corrected.

At this point, it is once again pointed out that the data necessary for the calibration of the proximity sensor 10 according to the invention is determined and stored in a storage that is not shown in more detail in FIG. 4. The proximity sensor 10 provides a measure for absolute distances D and does not need any reference in operation.

According to a development of the proximity sensor 10 or the method for measuring the distance D of a target 12, it is provided to determine the reflection factor $\Gamma$ and thus the distance D instead of with a predetermined frequency of the microwave oscillator 54 with at least two different frequencies. To switch between the frequencies, the switch 62 is provided that causes the microwave oscillator 52 to alternatingly provide the output signal 54 with the first and with the at least one further frequency. In doing so, as previously mentioned in connection with FIG. 7, further spiral courses 68, 70 emerge with a correct conformal mapping 38 of the reflection factor $\Gamma$ for further frequencies. Thus, theoretically, an increasing phase difference Ph $\Gamma$ ensues from the evaluation at two different frequencies with increasing distance D of the target 12, from said phase difference the clarity can be obtained. This embodiment is particularly advantageous for great distances D since here the course of the reference of the reflection factor $\Gamma$ is flatter and thus the determination thereof, where necessary, becomes more prone to error.

In principle, by measuring the distance D with two different frequencies and with one single wave mode, a plausibility check or verification of the determined distance D is possible.

A further advantageous development provides that, instead of the monomodal excitation, additionally further wave modes are produced in the waveguide 22 and the reflection factor $\Gamma$ is determined in the different wave modes. As a result, at least one further independent complex size is obtained that can be used for determining the distance D and/or removing the ambiguity in the phase Ph $\Gamma$. In this development, several wave mode transformers 20 are required.

In doing so, a plausibility check or verification of the determined distance D is also possible.

If necessary, for determining the distance D, both at least two different frequencies of the transmission wave 18 and at least two different wave modes can be used.

The determined measure for the distance D corresponding to the output signal 66 can be provided as an analogue signal. Alternatively or additionally, the output signal 66 can be provided as a switch signal that signalises that a certain distance D has been exceeded or has not been reached.

The arrangement previously described and the process previously described for determining the distance D apply not only to the known proximity sensor, but in particular apply in the same way to the proximity sensor 10 according to the invention.

The proximity sensor 10 according to the invention deviates from the proximity sensor known from the published patent application PCT/DE2013/000342 in that, according to the invention, two paths electromagnetically decoupled from each other in the waveguide 22, a transmission path 80 for the waveguide transmission wave 16b and at least one receiving path 82 for the waveguide reflection wave 30b, are provided.

The waveguide transmission wave 16b is guided exclusively in the transmission path 80 and irradiated at the aperture 26. The free space transmission wave 16c is reflected on the target 12 and irradiated by the target 12 as the free space reflection wave 30a in the direction of the waveguide 22.

The free space reflection wave 30a propagates in the receiving path 82 of the waveguide 22. In the exemplary embodiment shown it is assumed that the free space reflection wave 30a propagates not only in the one receiving path 82 but also in the transmission path 80 that thus is the transmission path 80 and receiving path 82 at the same time. Thus, the whole aperture 26 of the waveguide 22 is available for receiving the free space reflection wave 30a.

In this embodiment, the wave mode transformer 20 is formed in such a way that, on the on hand, it transforms the wire transmission wave 16a into the waveguide transmission wave 16b and transfers the reflected wave 16a in the transmission path 80 again into a wire-bound wave and, on the other hand, converts the hollow reflection wave 30b occurring in the receiving path 82 into a wire-bound wave at the receiving gate. The wave mode transformer 20 is implemented in the shown exemplary embodiment as a septum polariser, the mode of operation thereof having already been extensively described.

Thus, the reflection factor Γ between the received and transmitted wave in the transmission path 80 and the transmission factor tr between the received weave in the receiving path 82 and the transmitted wave in the transmission path 82 and the transmitted wave in the transmission path 80 can be determined from the wire-bound waves. Thus, the reflection factor Γ is defined by the quotient from the reflected and transmitted wave at one gate and the transmission factor tr is defined by the quotient from the received and transmitted wave at two different gates.

The substantial advantage with implementing the transmission path 80 and the receiving path 82 electromagnetically decoupled from one another in the waveguide 22 is that, in addition to the reflection factor Γ or alternatively to the reflection factor Γ, the transmission factor tr can be determined.

Figure 8:
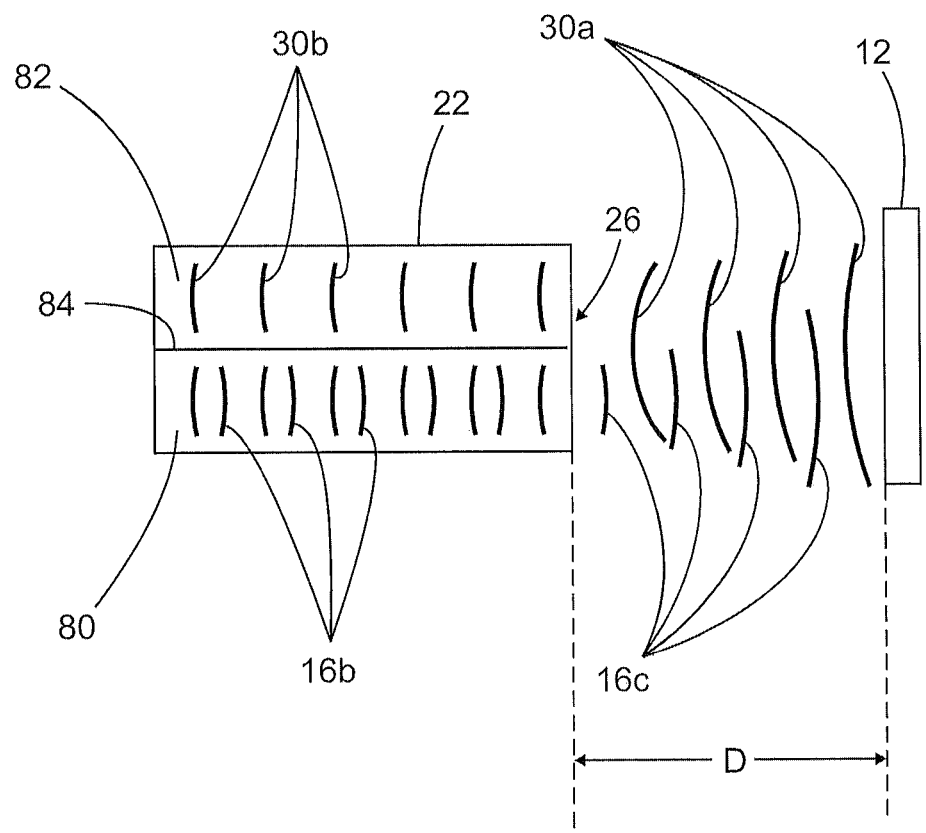
FIG. 8 shows signal paths decoupled from one another in a waveguide, wherein a transmission path and at least one receiving path are provided.

With the exemplary embodiment shown in FIG. 8, the uncoupling takes place between the transmission path 80 and the receiving path 82 by two separate waveguides in the waveguide 22 that can be provided by an electrically conductive separating wall 84.

Figure 9:
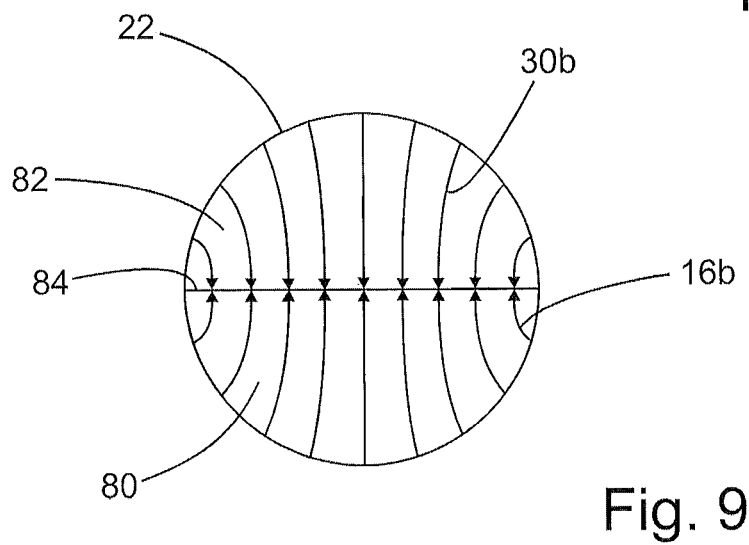
FIG. 9 shows a field distribution in the two paths.

Assuming that the waveguide 22 is implemented as a cylindrical waveguide 22, FIG. 9 shows a field distribution of the waveguide transmission wave 16b in the transmission path 80 and the waveguide reflection wave 30b in the receiving path 82.

FIG. 10 shows an advantageous embodiment of the waveguide 22 for implementing the transmission path 80 and the receiving path 82 electromagnetically separated from the transmission path 80. In this embodiment, the whole volume of the waveguide 22 is available for both the waveguide transmission wave 16b and the waveguide reflection wave 30b. Both the waveguide transmission wave 16b and the waveguide reflection wave 30b can use the whole opening provided by the waveguide 22. The separation in the transmission path 80 and the receiving path 82 takes place in the region of the wave mode transformer 20 implemented as a septum polariser, wherein the path 80, 82 are formed on the two sides of the septum polariser. Thus, the whole aperture 26 of the waveguide 22 is available for each signal path 80, 82 such that the irradiating and receiving properties of the waveguide 22 are optimised at a given outer diameter.

FIG. 11 shows a top view A-A' on the aperture 26 of the waveguide 22, based on the line A-A' in FIG. 10. In the exemplary embodiment shown, it is assumed that the waveguide transmission wave 16b is polarised to be circular rotating to the right (viewing direction in the wave propagation direction from behind onto the wave) and is irradiated as a corresponding right-rotating circularly polarised free space transmission wave 16c.

FIG. 12 shows a top view on the target 12, based on the line B-B' in FIG. 10. Because of the electrically conductive surface of the target 12, the right-rotating circularly polarised free space transmission wave 16c is reflected as a left-rotating circularly polarised free space wave 30a. Because of the mirror-inverted depicted top view in FIG. 12, based on FIG. 11, the rotational directions of the waves are indicated in opposition.

The left-rotating circularly polarised free space reflection wave 30a further appears in the waveguide 22 as a left-rotating circularly polarised waveguide reflection wave 30b.

The wave mode transformer 22 is implemented in the embodiment having circularly polarised waves, preferably as a septum polariser. In the exemplary embodiment shown, the wave mode transformer implemented as a septum polariser has a stepped planar structure that is preferably made with a photolithographic process and can thus be integrated directly on a board including further electronic components. The integration of electronic components in the waveguide 22 has already been explained above in more detail.

As previously mentioned, the substantial advantage of the invention is in the implementation of electromagnetically decoupled signal paths 80, 82 and that, additionally or alternatively to the reflection factor Γ, the transmission factor tr can be detected that is a measure that is able to be measured and depends on the distance D to the target 12.

The transmission factor tr describes the signal path that is formed by the transmission path 80 in the waveguide 22, the path course to the target 12 and back again to the receiving path 82 in the waveguide 22.

The connection between the distance D and the magnitude of the transmission factor tr can be influenced by the shaping of wave guidance inside the waveguide 22. For example, the location of the maximum magnitude is influenced by whether the transmission and receiving track 80, 82 are only led together on the active surface of the proximity sensor 10 or still inside the circular cylindrical waveguide 22. If the two paths 80, 82 run separately from each other up to the active surface, the transmission factor tr is zero at the target distance zero.

By contrast, the waveguide or sensor head can also be formed in such a way that the magnitude maximum of the transmission factor tr occurs when the target distance is zero, as is possible, for example, when using a septum polariser and circularly polarised waves.

Thus, in particular, the waveguide 22 can by implemented in such a way that the course of the transmission factor tr qualitatively corresponds to that of the reflection factor F.

This case brings the considerable advantage that the determination of the distance D can exclusively be based on the determination of the transmission factor tr. In doing so, a signal separation by the directional coupler 56 is not necessary since both the transmission wave 16 and the reflection wave are already separately present.

The invention claimed is:

1. A proximity sensor for measuring the distance of a target, having a microwave oscillator that provides, as an output signal, a transmission wave which is emitted by the proximity sensor in the direction of the target as a free-space transmission wave that the target, which is electrically conductive or at least has an electrically conductive surface, reflects as a free-space reflection wave and the proximity sensor receives as a reflection wave,
    wherein determining the distance from the transmission wave and the reflection wave is provided,
    wherein the transmission wave is guided in a waveguide as a waveguide transmission wave, and
    wherein coupling the transmission wave into the waveguide is provided by a wave mode that leads to detaching the waveguide transmission wave at the aperture on the front end of the waveguide into the free-space transmission wave and to propagating the free-space transmission wave to the target,
    wherein, in the waveguide, a transmission path is provided for guiding the transmission wave as a waveguide transmission wave and at least one receiving path that is electromagnetically decoupled from the transmission path is provided for guiding the reflection wave as a waveguide reflection wave,
    wherein the waveguide, a wave mode transformer and a signal processing arrangement form a one-part unit, and
    wherein the signal processing arrangement is configured to determine a phase and a magnitude of a reflection factor as a measure for the distance.

2. The proximity sensor according to claim 1, wherein the waveguide has two separate waveguides for the transmission path and the at least one receiving path.

3. The proximity sensor according to claim 1, wherein the two paths that have been decoupled from each other are implemented by a circularly polarized waveguide transmission wave and a waveguide reflection wave that is circularly polarized in the other rotational direction, wherein the rotation of the polarization direction on the target takes place by reflection.

4. The proximity sensor according to claim 3, wherein a wave mode transformer is provided to provide the circularly polarized waveguide transmission wave and to receive the waveguide transmission wave, said wave mode transformer being implemented as a septum polarizer.

5. The proximity sensor according to claim 1, wherein a TE11 mode is provided as the wave mode when using a circular-cylindrical waveguide.

6. The proximity sensor according to claim 1, wherein the waveguide is formed to be circular cylindrical.

7. The proximity sensor according to claim 1, wherein a dielectric window is provided at the aperture on the front end of the waveguide.

8. The proximity sensor according to claim 1, wherein the waveguide is filled with a dielectric material.

9. The proximity sensor according to claim 1, wherein at least one wave mode transformer is provided in the waveguide for establishing the wave mode of the waveguide transmission wave.

10. The proximity sensor according to claim 1, wherein a quadrature mixer is provided to determine the reflection factor from the transmission wave and the reflection wave.

11. The proximity sensor according to claim 1, wherein the 6-gate technique is provided to determine the reflection factor from the transmission wave and the reflection wave.

12. The proximity sensor according to claim 1, wherein the one-part unit has a housing comprising the waveguide.

13. A method for measuring the distance of a target in which an output signal of a microwave oscillator is provided as a transmission wave which is emitted in the direction of the target as a free-space transmission wave that the target, which is electrically conductive or at least has an electrically conductive surface, reflects as a free-space reflection wave and is received as a reflection wave,
    wherein the distance from the transmission wave and the reflection wave is determined,
    wherein the transmission wave is guided in a waveguide as a waveguide transmission wave,
    wherein coupling the transmission wave into the waveguide takes place with a wave mode that leads to detaching the waveguide transmission wave at the aperture on the front end of the waveguide into the free-space transmission wave and to propagating the free-space transmission wave to the target,
    wherein, in the waveguide, the transmission wave is led in a transmission path as a waveguide transmission wave and in at least one receiving path that is electromagnetically decoupled from the transmission path the reflection wave is led as a waveguide reflection wave,
    wherein a reverse calculation of a determined first reflection factor from the transmission wave and the reflection wave is provided on a reflection factor emerging on an aperture of the waveguide, and
    wherein a determination of a phase and a magnitude of a reflection factor is provided as a measure for the distance.

14. The method according to claim 13, wherein the distance is determined from the reflection factor or the transmission factor.

15. The method according to claim 13, wherein the distance is determined from the reflection factor and the transmission factor.

16. The method according to claim 13, wherein a TE11 wave mode is provided as the wave mode when using a circular-cylindrical waveguide.

17. The method according to claim 13, wherein the determination of the distance takes place at a frequency of the transmission wave and a wave mode.

18. The method according to claim 13, wherein to determine the distance an adjusting of the microwave oscillator takes place alternatingly on at least two different frequencies of the transmission wave and the determination of the distance takes place on at least two different frequencies and one wave mode.

19. The method according to claim 13, wherein at least one second wave mode is provided for coupling the transmission wave into the waveguide alternatingly to the first wave mode.

20. The method according to claim 13, wherein the determination of the distance takes place at one frequency of the transmission wave and in at least at two different wave modes.

21. The method according to claim 20, wherein such a further wave mode is predetermined that leads to an extensively evanescent field distribution in front of the waveguide.

22. The method according to claim 21, wherein the TM01 mode is provided as at least one further wave mode when using a circular-cylindrical waveguide.

23. The method according to claim 18, wherein the determination of the distance takes place on at least two different types of waveguide transmission wave and a plausibility check of the results determined on the different types of waveguide transmission wave is provided.

24. The method according to claim 13, wherein the reverse calculation takes place by a conformal mapping.

25. The method according to claim 13, wherein an unambiguous determination of the distance from the phase of the reflection factor is provided by the magnitude of the reflection factor when there is ambiguity of the phase of the reflection factor within the predetermined measuring region.

26. The method according to claim 13, wherein a rough calibration takes place.

27. The method according to claim 13, wherein a fine calibration takes place.

28. The method according to claim 13, wherein a determined measure for the distance (D) corresponding to the output signal is provided as an analog signal.

29. The method according to claim 13, wherein a switch signal is provided that signals that a certain distance has been exceeded or has not been reached.

* * * * *